United States Patent
Alcalde et al.

(10) Patent No.: US 7,982,117 B2
(45) Date of Patent: Jul. 19, 2011

(54) MUSIC INTELLIGENCE UNIVERSE SERVER

(75) Inventors: Vincenç Gaitan Alcalde, Castellà del Vallès (ES); Julien Richard, Barcelona (ES); Antonio Trias Bonet, Saint Cugat del Valles (ES); Antonio Trias Llopis, Saint Cugat del Valles (ES); Jesús Sanz Marcos, Barcelona (ES)

(73) Assignee: Polyphonic Human Media Interface, S.L., Barcelona (ES)

( * ) Notice: Subject to any disclaimer, the term of this patent is extended or adjusted under 35 U.S.C. 154(b) by 0 days.

(21) Appl. No.: 12/753,169

(22) Filed: Apr. 2, 2010

(65) Prior Publication Data
US 2010/0250471 A1    Sep. 30, 2010

Related U.S. Application Data

(60) Division of application No. 11/825,457, filed on Jul. 6, 2007, and a continuation-in-part of application No. 11/492,355, filed on Jul. 25, 2006, now abandoned, which is a continuation of application No. 10/678,505, filed on Oct. 3, 2003, now Pat. No. 7,081,579.

(60) Provisional application No. 60/857,627, filed on Nov. 8, 2006, provisional application No. 60/415,868, filed on Oct. 3, 2002.

(51) Int. Cl.
*G10H 7/10*    (2006.01)

(52) U.S. Cl. .......................................................... 84/608
(58) Field of Classification Search .................. 84/608, 84/609, 626, 667, 604–607, 623, 693, 660, 84/661, 697–699
See application file for complete search history.

(56) References Cited

U.S. PATENT DOCUMENTS

| | | | | |
|---|---|---|---|---|
| 5,792,971 A * | 8/1998 | Timis et al. | ..................... | 84/609 |
| 5,918,223 A * | 6/1999 | Blum et al. | ........................... | 1/1 |
| 6,201,176 B1 * | 3/2001 | Yourlo | ............................. | 84/609 |
| 7,031,980 B2 * | 4/2006 | Logan et al. | .......................... | 1/1 |
| 2002/0002899 A1 * | 1/2002 | Gjerdingen et al. | ............ | 84/667 |
| 2002/0053275 A1 * | 5/2002 | Ogawa et al. | ..................... | 84/662 |
| 2002/0147628 A1 * | 10/2002 | Specter et al. | ................... | 705/10 |
| 2003/0045953 A1 * | 3/2003 | Weare | .............................. | 700/94 |
| 2005/0038819 A1 * | 2/2005 | Hicken et al. | ............... | 707/104.1 |
| 2006/0190450 A1 * | 8/2006 | Holm et al. | ........................ | 707/6 |
| 2007/0030980 A1 * | 2/2007 | Goodman et al. | ............... | 381/86 |
| 2008/0059287 A1 * | 3/2008 | Bonet et al. | ...................... | 705/10 |

* cited by examiner

*Primary Examiner* — Jianchun Qin
(74) *Attorney, Agent, or Firm* — Whiteford, Taylor & Preston LLP; Jeffrey C. Maynard

(57) ABSTRACT

An artificial intelligence song/music recommendation system and method is provided that allows music shoppers to discover new music. The system and method accomplish these tasks by analyzing a database of music in order to identify key similarities between different pieces of music, and then recommends pieces of music to a user depending upon their music preferences.

14 Claims, 27 Drawing Sheets

MUSIC INTELLIGENCE UNIVERSE SERVER

CROSS REFERENCE TO RELATED APPLICATIONS

This application is a division of U.S. patent application Ser. No. 11/825,457, filed with the U.S. Patent and Trademark Office on Jul. 6, 2007 entitled "Music Intelligence Universe Server", which claims benefit of U.S. Provisional Patent Application Ser. No. 60/857,627 entitled "Music Intelligence Universe Server", filed with the U.S. Patent and Trademark Office on Nov. 8, 2006, the specifications of which are incorporated herein by reference. Additionally, U.S. patent application Ser. No. 11/825,457 is a continuation-in-part of U.S. patent application Ser. No. 11/492,355, filed with the U.S. Patent and Trademark Office on Jul. 25, 2006 now abandoned entitled "Method and System for Music Recommendation", which is a continuation of U.S. patent application Ser. No. 10/678,505, filed with the U.S. Patent and Trademark Office on Oct. 3, 2003 entitled "Method and System for Music Recommendation", now U.S. Pat. No. 7,081,579, which is based upon and claims benefit of U.S. Provisional Patent Application Ser. No. 60/415,868 entitled "Method and System for Music Recommendation", filed with the U.S. Patent and Trademark Office on Oct. 3, 2002, the specifications of which are incorporated herein by reference.

BACKGROUND OF THE INVENTION

1. Field of the Invention

The invention disclosed herein relates generally to methods and systems for analyzing and using digital music compositions, and more particularly to a method and system for determining the characteristics of a musical composition by analyzing its digital composition, and recommending particular musical compositions to users based upon the relative comparability of a user's desired musical characteristics and the musical characteristics of a collection of digital music.

2. Background of the Prior Art

Historically, what is pleasing to the human ear has not changed since man began making sounds. Patterns in music that are pleasing to the human ear have not changed much, if at all, since the times of the classical composers. What has changed are styles, performances, the instruments used, and the way music is produced and recorded; but a compelling melody is still compelling and a series of random notes still sounds random. For example, the dictionary describes melody as a series of notes strung together in a meaningful sequence. Unfortunately, some sequences sound meaningful and make up a beautiful song and other sequences just sound like noise.

While the number of possible melody patterns combined with all of the other variables in recorded music allow for a seemingly infinite number of combinations, the patterns that we find pleasing have not changed. That is not to say everything has been invented, however. So far, every new style of music that has come into being: country, rock, punk, grunge etc. have all had similar mathematical patterns. The hits in those genres have all come from the same 'hit' clusters that exist today and anything that has fallen outside of such 'hit' clusters has rarely been successfully on the charts for its musical qualities.

SUMMARY OF THE INVENTION

It is an object of the present invention to provide a method and system for measuring the characteristics of a musical composition, and establishing a collection of digital musical compositions that may be sorted based upon such characteristics.

It is another object of the present invention to provide a method and system for determining a preferred musical characteristic profile for a music listener.

It is another object of the present invention to enable a method and system to compare digital music files to discover mathematically similar songs.

In accordance with the above objects, an artificial intelligence song/music recommendation system and method is provided that allows music shoppers to discover new music. The system and method accomplish these tasks by analyzing a database of music in order to identify key similarities between different pieces of music, and then recommends pieces of music to a user depending upon their music preferences.

The system uses a series of complex artificial intelligence algorithms to analyze a plurality of sonic characteristics in a musical composition, and is then able to sort any collection of digital music based on any combination of similar characteristics. The characteristics analyzed are those that produce the strongest reaction in terms of human perception, such as melody, tempo, rhythm, and range, and how these characteristics change over time. This approach enables the creation of "constellations" of music with similar characteristics, even from different genres and styles, enabling fast yet highly individualized music discovery. Further personalized music discovery is enabled based on a "Music Taste Test".

To provide users with music recommendations, the system employs a number of analysis functions. A "Music Taste Test" (MI Mood module) function learns a user's music preferences via a series of binary choice questions, and delivers lists and/or personalized song recommendations to the user based on this information. Recommendations are prioritized and listed in order of closest song match on a theoretical multi-dimensional grid. A "Soundalikes" function links songs having similar musical/mathematical profiles enabling for music recommendation. This function was referred to as "more like this" in U.S. Pat. No. 7,081,579 to Alcalde et al., the specification of which is incorporated herein by reference. A "Discovery" function also links songs having similar mathematical patterns, but allows for a wider recommendation than the "Soundalikes" function. The "Music Taste Test" function and "Soundalikes" function cooperate to establish 'moods' for each song, such as happy, sad, calm, and energetic.

The various features of novelty that characterize the invention will be pointed out with particularity in the claims of this application.

BRIEF DESCRIPTION OF THE DRAWINGS

Other objects, features, and advantages of the present invention will become more apparent from the following detailed description of the preferred embodiments and certain modifications thereof when taken together with the accompanying drawings, in which.

DESCRIPTION OF EXEMPLARY EMBODIMENTS

The invention summarized above and defined by the enumerated claims may be better understood by referring to the following description, which should be read in conjunction with the accompanying drawings. This description of an embodiment, set out below to enable one to build and use an implementation of the invention, is not intended to limit the enumerated claims, but to serve as a particular example thereof. Those skilled in the art should appreciate that they may readily use the conception and specific embodiment(s) disclosed as a basis for modifying or designing other methods and systems for carrying out the same purpose(s) of the present invention. Those skilled in the art should also realize that such equivalent assemblies do not depart from the spirit and scope of the invention in its broadest form.

Figure 1:
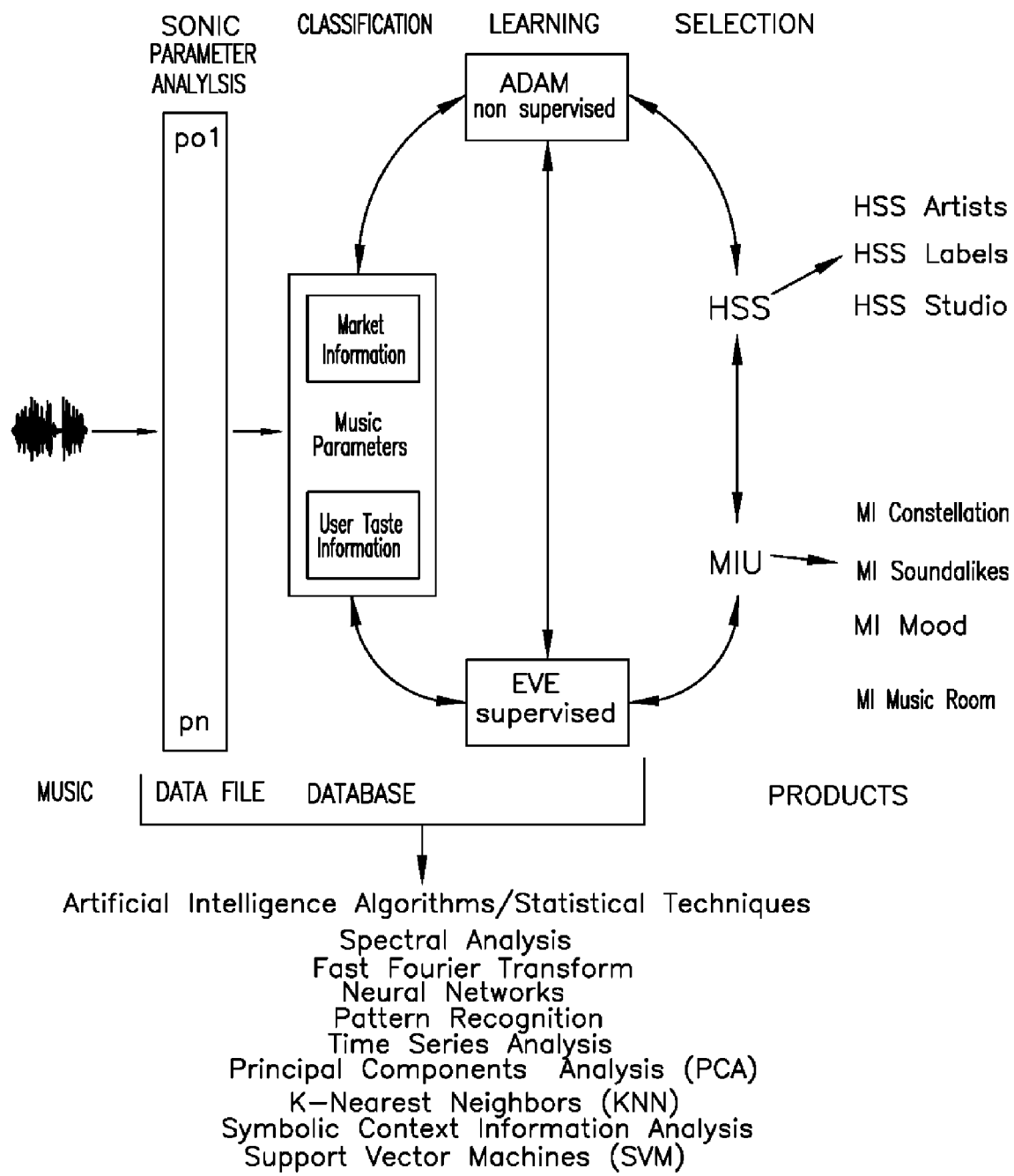
FIG. 1 is a schematic overview of a system according to the present invention.

Referring to FIG. 1, the method and system of the instant invention enable the analysis and processing of digital music in order to establish a description of a number of characteristics of the music, and likewise enable recommending a collection of music having particular characteristics to a user who has established a desired musical characteristic profile.

The raw materials for the system are music and songs. These are stored in a digital file, which is the main starting point for all embodiments. The first step performed by the system is to analyze an existing digital music file in order to create a descriptive profile for the musical characteristics of the song. The music analysis mimics human hearing and perception. In a first stage, the analysis portion reads a song file and extracts some data. This data can be represented as a series of numbers, which are the main input for future processing. Such processing depends on the final application, and can use algorithms such as Principal Components Analysis (PCA), KNearest Neighbors (kNN), etc.

The processes, according to the present invention, start by analyzing a large and representative sample of music. The process analyzes more than 60 characteristics of the music, such as brightness and tempo, and measures how the characteristics change over time. The selected characteristics have been identified in user testing to produce the strongest reaction. Often the characteristics are perceived unconsciously by the listener, and the correct mix of parameters is more important than any individual parameter by itself. Parameter analysis is described in U.S. Pat. No. 7,081,579 to Alcalde et al., the specification of which is included herein by reference, in its entirety.

In a preferred embodiment, the processes described herein measure innovation/prediction cycles in musical structure by using spectrum variables for power law detection. They also measure deviation analysis from the universality trend through detection of cycles from the universality trend and the detection of innovation and prediction wavelets.

Following analysis of the sonic parameters, software modules according to a preferred embodiment of the present invention learn a user's musical preferences. The software uses two modules; one called ADAM, a cluster recognition engine, and another called EVE, a music recommendation engine.

ADAM is a conceptual clustering engine that is based on physical pattern recognition models. This non-supervised learning system generates a hierarchical tree structure that is based on topological metrics, which automatically determines the final number of clusters while allowing for automated related variable detection. The methodology for detecting social trends is completely scalable, and has been successfully applied in many other areas. It is also used for the preliminary visualization engine described in more detail below.

EVE is a non-linear kernel learner, which had been successfully used in many other commercial applications. This supervised learning system uses technology that has been proven to outperform statistical and neural network systems. A mathematically elegant solution which is relatively easy to customize and refine, the algorithm uses a direct strategy to capture personal Von Neumann Morgenstern utility functions. Due to their elegant and parsimonious mathematical architecture, both ADAM and EVE have been easily ported to new operating system environments, such as Symbian 60.

After the system has learned a user's musical preferences, it can connect the user with music selections based on his or her likes and dislikes. The Hit Song Science (HSS) techniques are described in U.S. Pat. No. 7,081,579. The Music Intelligence Universe (MIU) techniques are herein described below.

Figure 2:
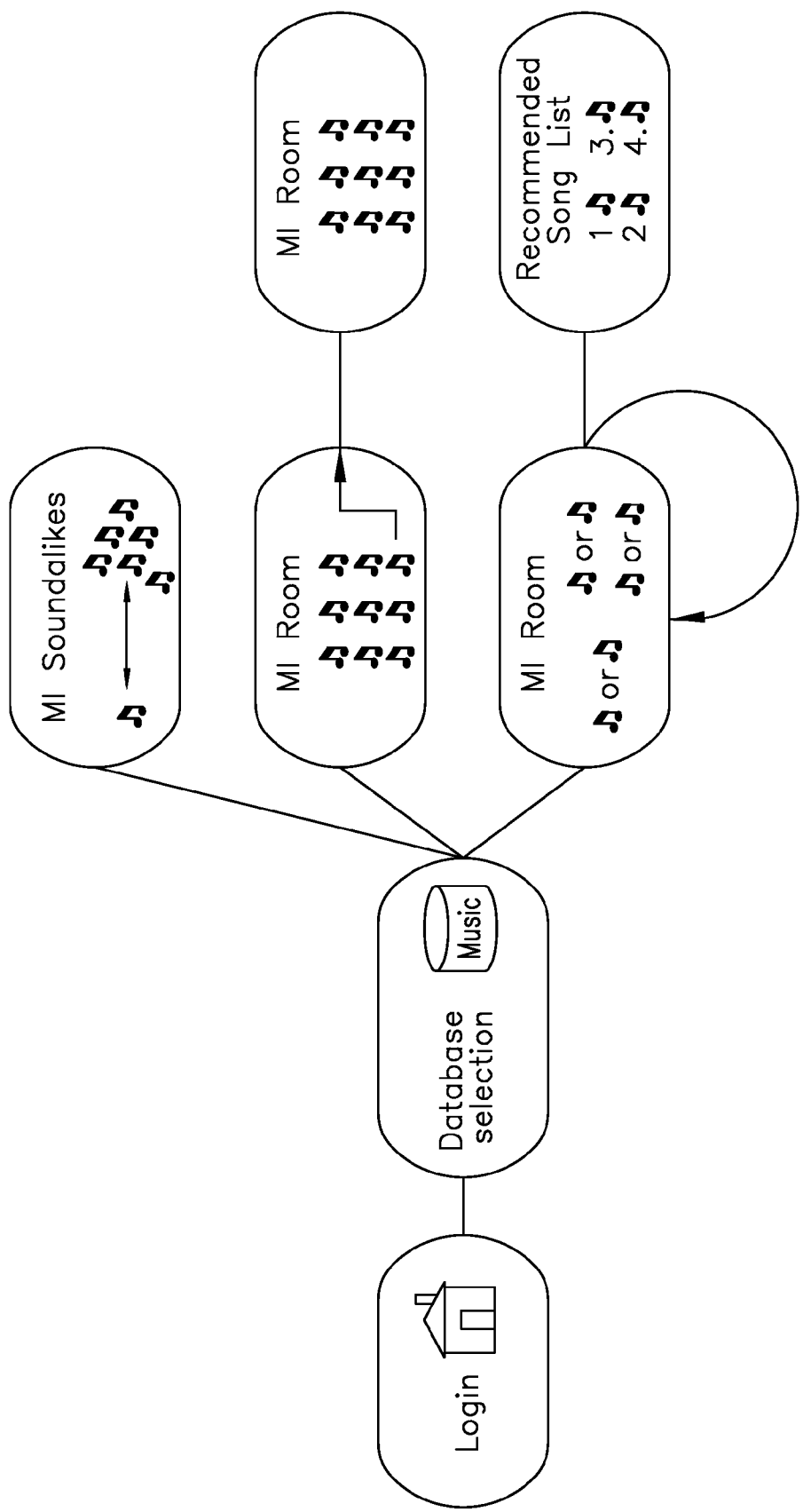
FIG. 2 is an overview of the server configuration accessible by a user of the present invention.

FIG. 2 depicts a schematic view of a system architecture for enabling the processing of digital music files to an automated digital music file analysis tool in order to generate an output file that serves as a descriptor of the musical characteristics of the particular musical composition that was analyzed. The output of such analysis engine may be used by the recommendation utilities described below.

Once the catalogue of music has been analyzed, the technology of the present invention can give music recommendations in five different ways:
  MI Soundalikes ("More like this")
  MI Discovery
  MI Mood
  MI Room (or Music Room)
  MI Constellation (or Music Constellation)
In all cases, results can be customized further as the user can opt to receive music matches across genres, time periods, or other customizable factors.

Figure 3:
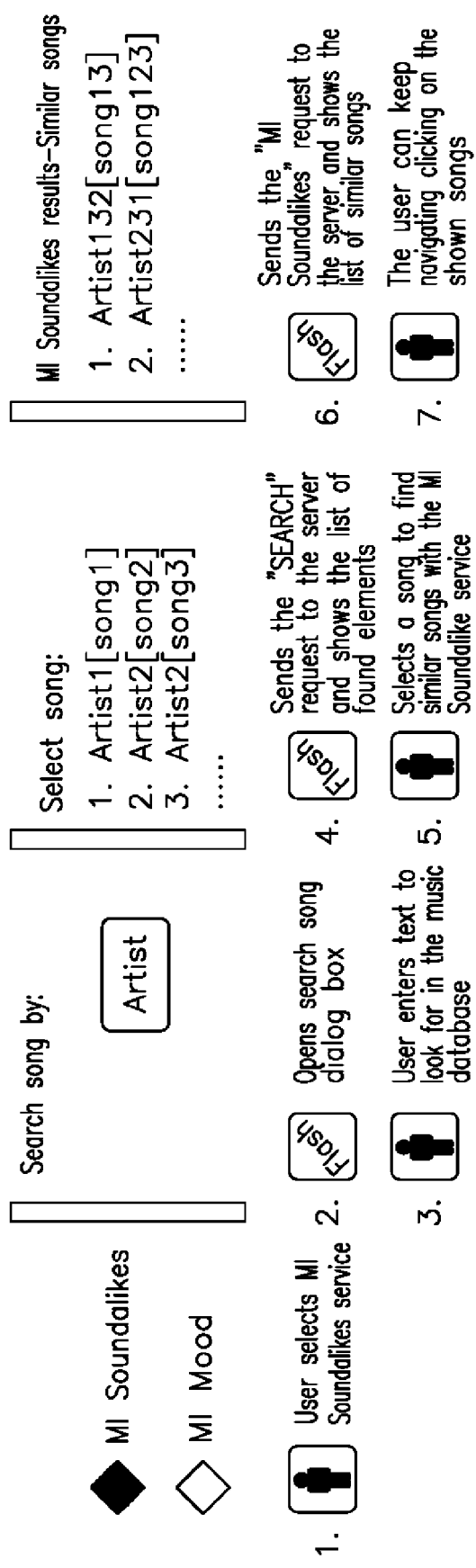
FIG. 3 is a chart of the MI Soundalikes service according to the present invention.
Figure 4:
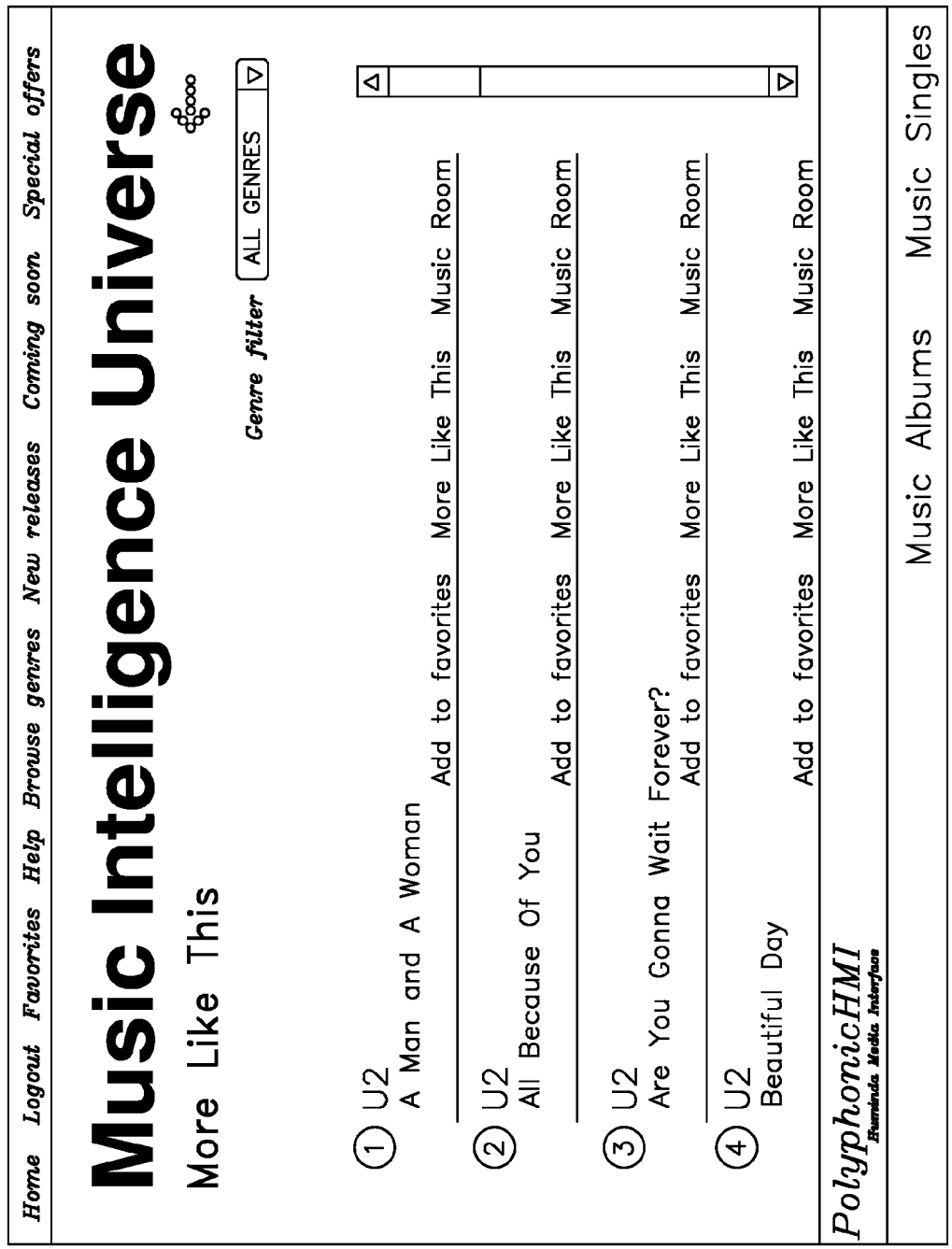
FIG. 4 is an illustration of a graphical user interface for the MI Soundalikes service according to the present invention.

The first kind of user interaction is related to the MI Soundalikes service, as shown in FIG. 3. This technique links a song or group of songs to a selection of music that has a similar profile. It takes the individual mathematical profile of the song or songs and compares it to all the music in the database. Given a list of songs, each can have a "Soundalikes" link to similar music. A User inputs a "seed" song or group of songs to generate a playlist of songs that have a similar analysis profile. This technique takes the individual profile of the song or songs and matches it to the whole catalogue of music in the database. The user can use the database music search engine to find songs by specifying the artist name, song title name, genre, year, etc. to select a song. An example of a user interface to select similar music is shown in FIG. 4. This service enables the user to find a list of songs musically similar to the selected one, and the key point is that no meta-tag (artist name, genre, etc) information is used to find the similarity; only the recorded song sound, only the music itself. MI Soundalikes produces a list of songs that are most similar; and MI Discovery offers a wider range of similarity allowing for further music discovery.

The system can also learn from implicit information (if available), namely songs previously downloaded, or listened by the user. The system will take this list of songs as an initial music profile of the user. The system also integrates other user-based information that allows for users-groups collaboration when presenting an integrated recommendation.

Similarly, the system allows for analyzing a personal music catalogue, classifying it, and determining the different clusters of the user's catalogue. The system can then recommend new songs that match the catalogue profile either as a whole, or as matching some particular cluster of the catalogue. In the same way, the system allows for music recommendation to a group of users, taking the musical "group profile" as the initial music input for the system.

Figure 5:
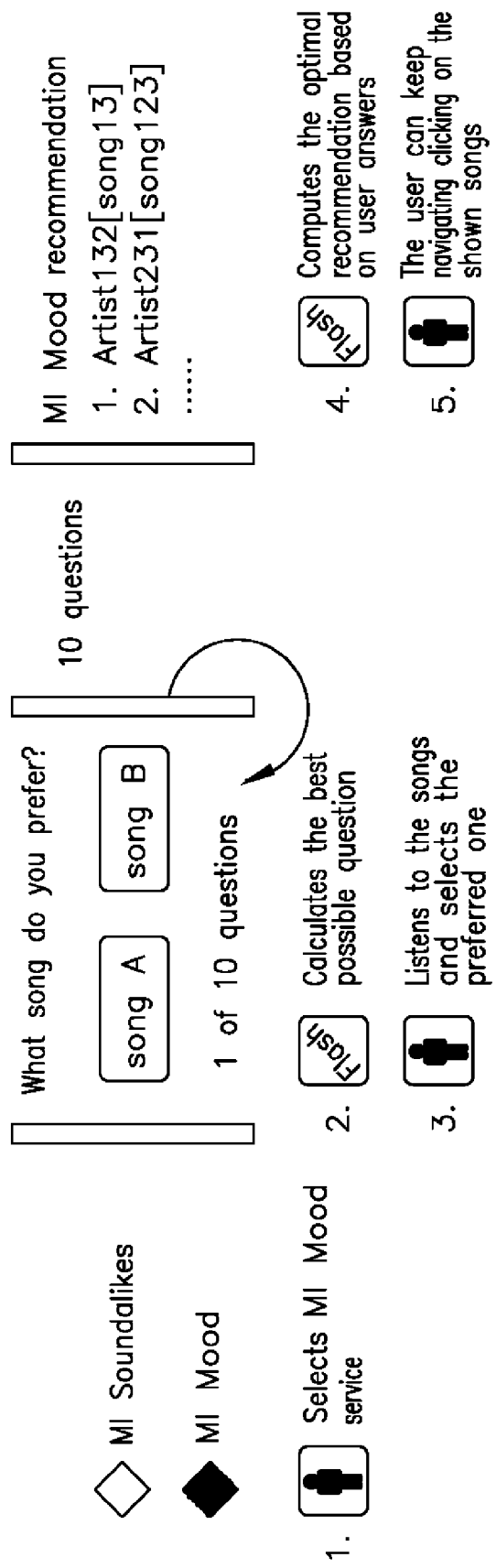
FIG. 5 is a chart of the MI Mood service according to the present invention.
Figure 6:
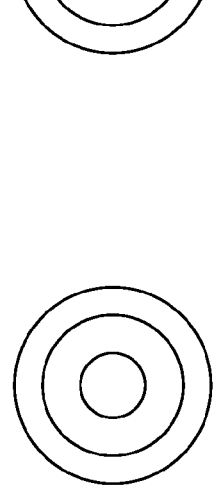
FIG. 6 is an illustration of a graphical user interface for the MI Mood service according to the present invention.

The second kind of user interaction is the MI Mood service, as shown in FIG. 5. The user expects a list of recommended songs from the server. The MI Mood service discovers a user's unique personal musical taste by directing them through a "music taste test". Users are presented with a number of binary choices between two short audio clips and will choose the sound clip they prefer. An example of a user interface for the music taste test is shown in FIG. 6. After a series of questions, it is possible to generate a taste profile for that user; the profile is analogous to a song profile, as measured in the analysis phase. The user profile is then matched with a song's own profile, as measured by the music analysis. In this way, songs from the database that share commonalities to the user's taste profile can be suggested. In a preferred embodiment, a final refinement may be done offering the user the choice between four songs that are closest to his/her taste at that moment. In this way, those songs from the database that best match the user's personal taste, within the users' particular mood when taking the test, are identified and presented to the user. The server solves this task by having the user iteratively select the preferred song from pairs of songs. The server is able to estimate user music taste (mood) by analyzing the answers and searching new questions with artificial intelligence learning techniques.

Figure 7:
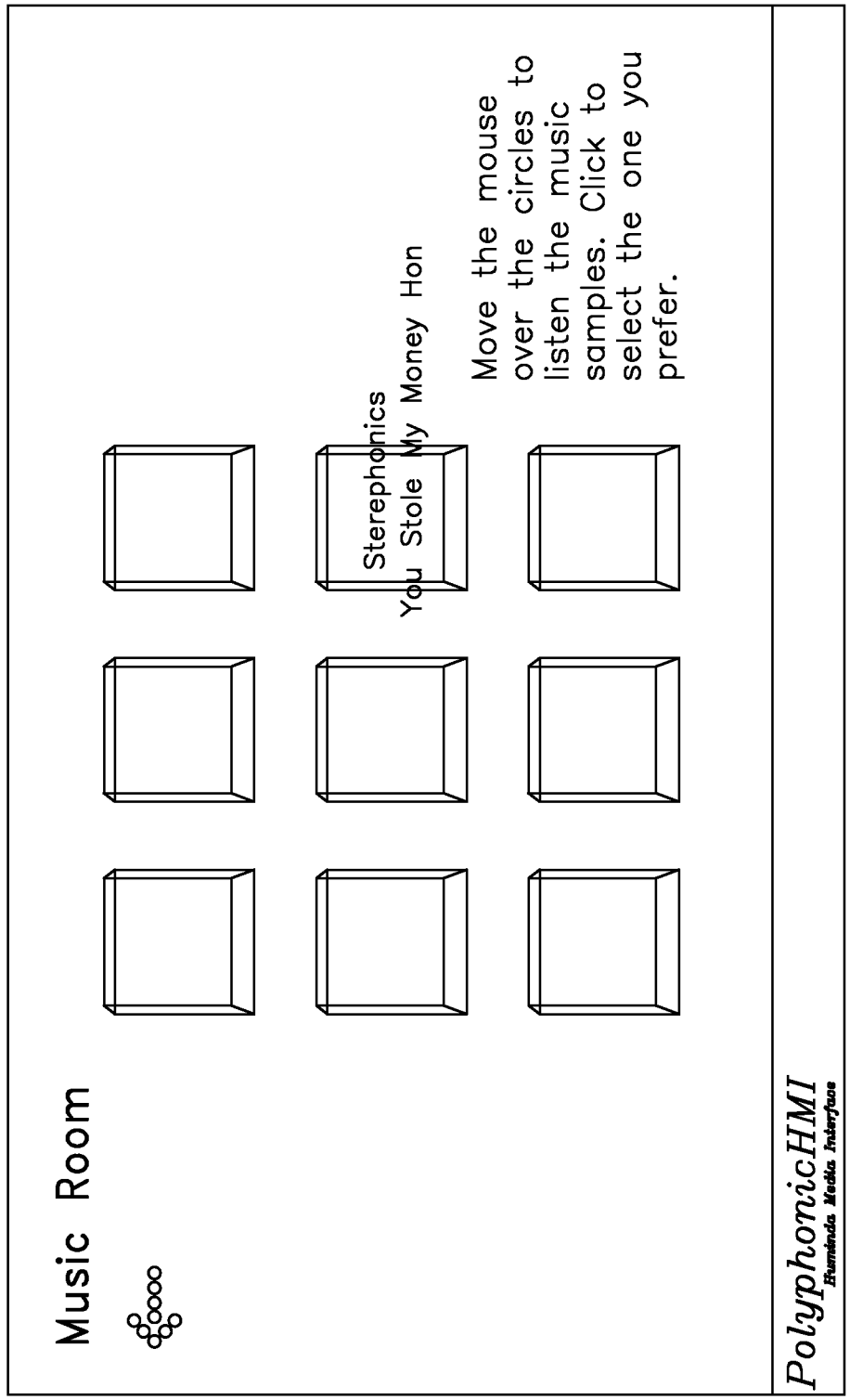
FIG. 7 is an illustration of a graphical user interface for the MI Room service according to the present invention.

Finally, the third kind of interaction is the MI Room service, which is an enhanced combination of the MI Soundalikes and MI Mood services. As shown in FIG. 7, the user also selects a song that he or she likes and this service suggests nine other songs that define a 3 by 3 room in the space. The similarity of the nine selected songs varies depending on the position on the room so the user can easily navigate through the Music Universe and find new songs from artists not previously known.

The user can listen to a 30-second clip of each of the nine songs and select any one song. Upon selection from the nine choices, the user is moved in the room selected. The second room would contain mathematically similar songs. Up to three times the user enters a room based upon the choice of one song out of nine. This approach allows for a level of personalization on the recommendation by means of the 3-step navigation through the music rooms. The initial song, selected by the user, is taken as the "seed" song. The system further refines, through the users' music room choice, and learns what the user likes from that song. Therefore, two different users may start with the same song and receive a different and personalized recommendation. In contrast, using MI Soundalikes would yield the same recommendation for users that select the same "seed" song, if the same music catalogue is used for providing the recommendation.

In a preferred embodiment, the MI Mood taste test algorithms can be combined with MI Soundalikes music recommendation to create a list of music that is not only similar to the "seed" song, but also similar in a way that exactly matches the user's musical mood, within the users' music personality.

Figure 8:
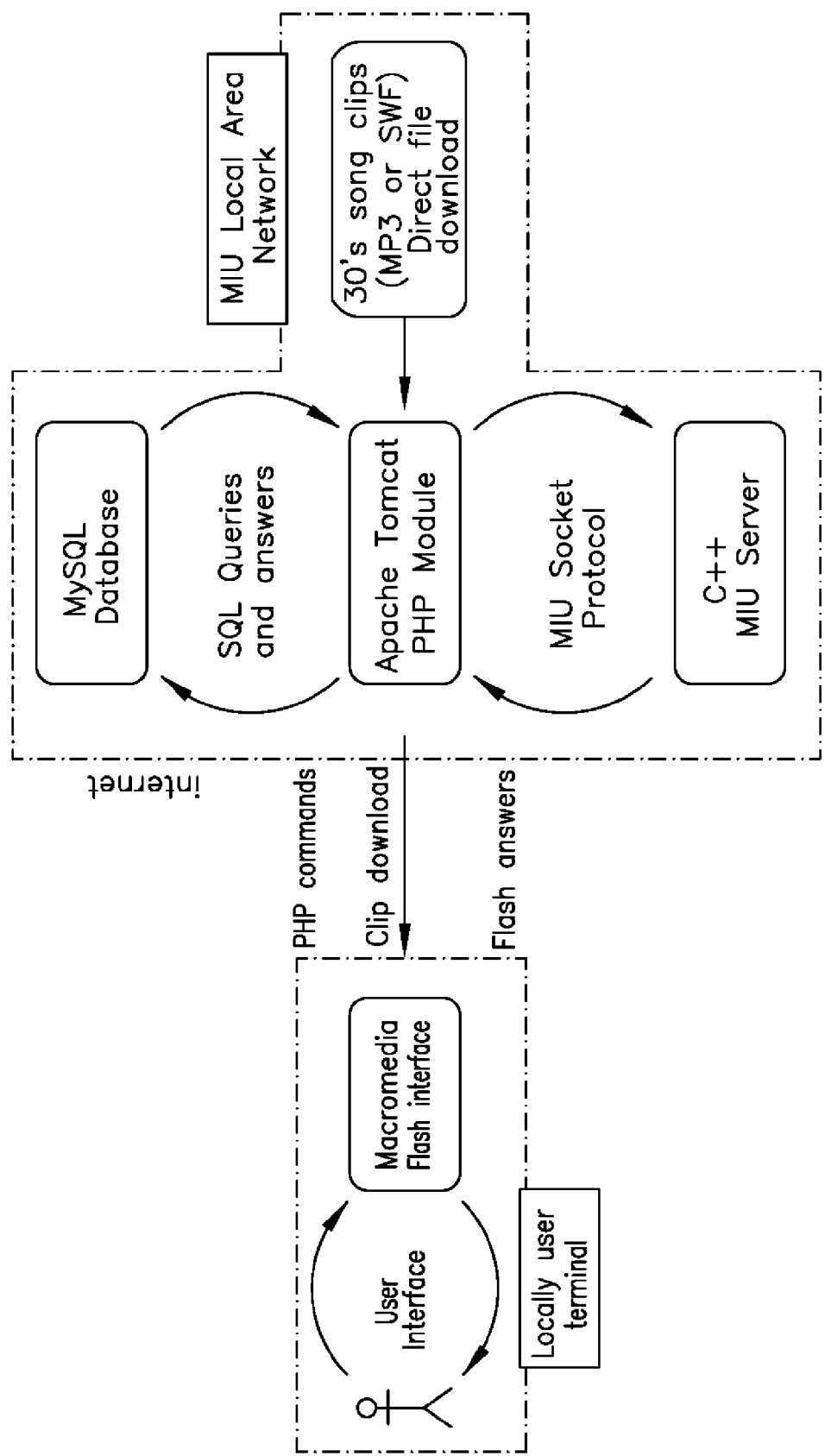
FIG. 8 is a schematic of the global system architecture of the present invention.

FIG. 8 shows the server architecture that has been developed to interact with a user though an active web page. The user interacts locally with a user visual interface. In a preferred embodiment, the visual interface may be a downloaded Macromedia Flash Player that runs locally on the user terminal and communicates with the Music Intelligence Universe Environment. The MIU environment comprises several modules:
  The music database module consists of a database server, such as a MySQL Database, that stores metadata information for songs (artists, genre, year, 30-second clip location, etc).
  The music clip storage module stores 30-second clips of all the songs that are in the database so the visual interface can download them.
  The MIU server module makes all the computations necessary to provide the services. In a preferred embodiment, the server module comprises an ANSI C++ portable application that communicates via sockets.
  The Web server module manages all the communications with the rest of the modules and with the user visual interface. In a preferred embodiment, the web server module may be an active web page coded in PHP that runs under an Apache Tomcat Web server.

The starting point of the Music Intelligence Universe is the ability to extract quantitative information from a song stored in digital format. The different types of mathematical procedures used to extract song descriptor are described in detail in U.S. Pat. No. 7,081,579. The analysis module is designed to be extremely portable and self-constituent, which means that it contains all the information it requires. Accordingly, the input of the MIU server is a list of songs with their respective descriptors (set of real numbers that could define different type of signal analysis, for example, the mean frequency, the level of noise, the mean power, tempo, rhythm, beat, etc). A unique identifier is assigned to each song, which is used to retrieve metadata from the database, such as artist name, song title, 30-second clip, etc.

Sometimes it is useful to apply a technique called Eigen Value Decomposition to find a reduced set of useful descriptors such as based on Principle Component Analysis (PCA) condensing the information because descriptors are not totally independent. So as to be able to filter the recommended song list, some auxiliary non-mathematical information is also sent to the server (such as, the year and the genre of the song). All this information is stored in an ASCII file that the MIU Server can read, parse, and analyze. The format of the MIU Server input ASCII file may be as follows:

id;0;1;1; YEAR;GENRE;PCA1;PCA2;PCA3;VAR1; VAR2;VAR3;VAR4;VAR5 . . .

where PCA# refers to specific parameter values and VAR# refers to the song descriptors.

Referring again to FIGS. 3 and 5, MI Soundalikes and MI Room services are the simplest services of the MIU Server. Both services are very similar and both methods use a list of most similar songs with decreasing similarity. The difference between them is that MI Room allows for a level of personalization for the user, while MI Soundalikes is based only on the song selected by the user, and the music catalogue in use. In the MI Room only nine of the songs are presented to the user in a 3×3 structure and indexes could be for example: 1, 20, 40, 60 80, 100, 120, 140, 150, which gives the user a wider spectrum to perform music navigation and discovery.

However, the way a song file is constructed is the same in both methods: a "seed" song is given (as a service input parameter) and the PCAs or the descriptors of the song are retrieved and stored.

seed song $S_s = (s_0, s_1, s_2, \ldots, s_{N-1})$

The Euclidean distance is evaluated with the rest of the songs in the database. In some embodiments, filters can be activated, such as a genre filter. A list of a specified length is selected containing songs with minimum distance from the seed song.

filtered song $S_f = (d_0, d_1, d_2, \ldots, d_{N-1})$ $$\text{euclidean distance } d = \sqrt{\sum_{n=0}^{N-1} (S_n - d_n)^2}$$

The PHP module has the possibility to select whether to use the PCAs or the descriptors. With PCAs, the calculations are done faster, but, with the descriptors, it will be possible to also send weights to disable some descriptors and find, for example, songs with similar rhythm, but with different tempo.

The encoding transforms the input ASCII file that contains song identifiers, genre, PCAs, and descriptors into three binary files designed to improve MIU performance. These three files are:

Songs file (usually DBNAME.songs.miuserver.bin): contains song information (id, genre, year, PCAs, and descriptors) that is ciphered to complicate song descriptor retrieval. It is a simple way to protect descriptor information so binary files can be stored in client servers without jeopardizing the analysis.

Learning files (usually DBNAMEdearning.miuserver.bin): contains the learning pre-calculated tree described below.

Clusters files (usually DBNAME.clusters.miuserver.bin): Data clustering is a common technique for statistical data analysis, which is used in many fields, including machine learning, data mining, pattern recognition, image analysis, and bioinformatics. Clustering is the classification of similar objects into different groups, or more precisely, the partitioning of a data set into subsets (clusters), so that the data in each subset (ideally) share some common trait—often proximity according to some defined distance measure. Machine learning typically regards data clustering as a form of unsupervised learning. This file stores information about the clusterization performed with the ADAM technology that can be used to refine music recommendation.

The rationale under the EVE learning technology applied to the music is to consider that human music taste has a linear behavior with some sound descriptors. To understand the invention we will describe an example with only two descriptors: rhythm and tempo. Songs are analyzed and a vector containing song tempo and song rhythm is created for each song:

$$\text{song}\#i \; \vec{s}_i = (\text{tempo}_i, \text{ryhtm}_i) = (x_i, y_i)$$

Both the tempo and the rhythm are normalized in the interval [0, 1] and are projected into a bidimensional space. In this example, user taste is also a vector with two variables. Using EVE technology on the taste vector, the songs can be graded using the dot product:

$$\text{user taste } \vec{w} = (w_0, w_1)$$
$$\text{user song grade } m = \vec{s}_i \vec{w} = (x_i, y_i)(w_0, w_1) = x_i w_0 + y_i w_1$$

Classical EVE is able to extract user taste $\vec{w}$ by asking the user several questions. These questions consist of presenting to the user pairs of songs and asking the user to select the preferred one between the pairs of songs. Each answer refines the estimated user taste $\vec{w}$.

There is one requirement, however, that cannot be fulfilled in classical EVE for music taste tester. Classical EVE imposes that songs vectors must be normalized:

$$|\vec{s}_i| = \sqrt{x_i^2 + y_i^2} = 1$$

As an example of how EVE works, the song database can be reduced to contain only the songs that follow this condition. First, the bidimensional song universe is depicted together with the songs that are inside the normalization region. This condition states that a music estimation vector can only be used to compare between songs that have the same norm, which one could say is useless.

Figure 9:
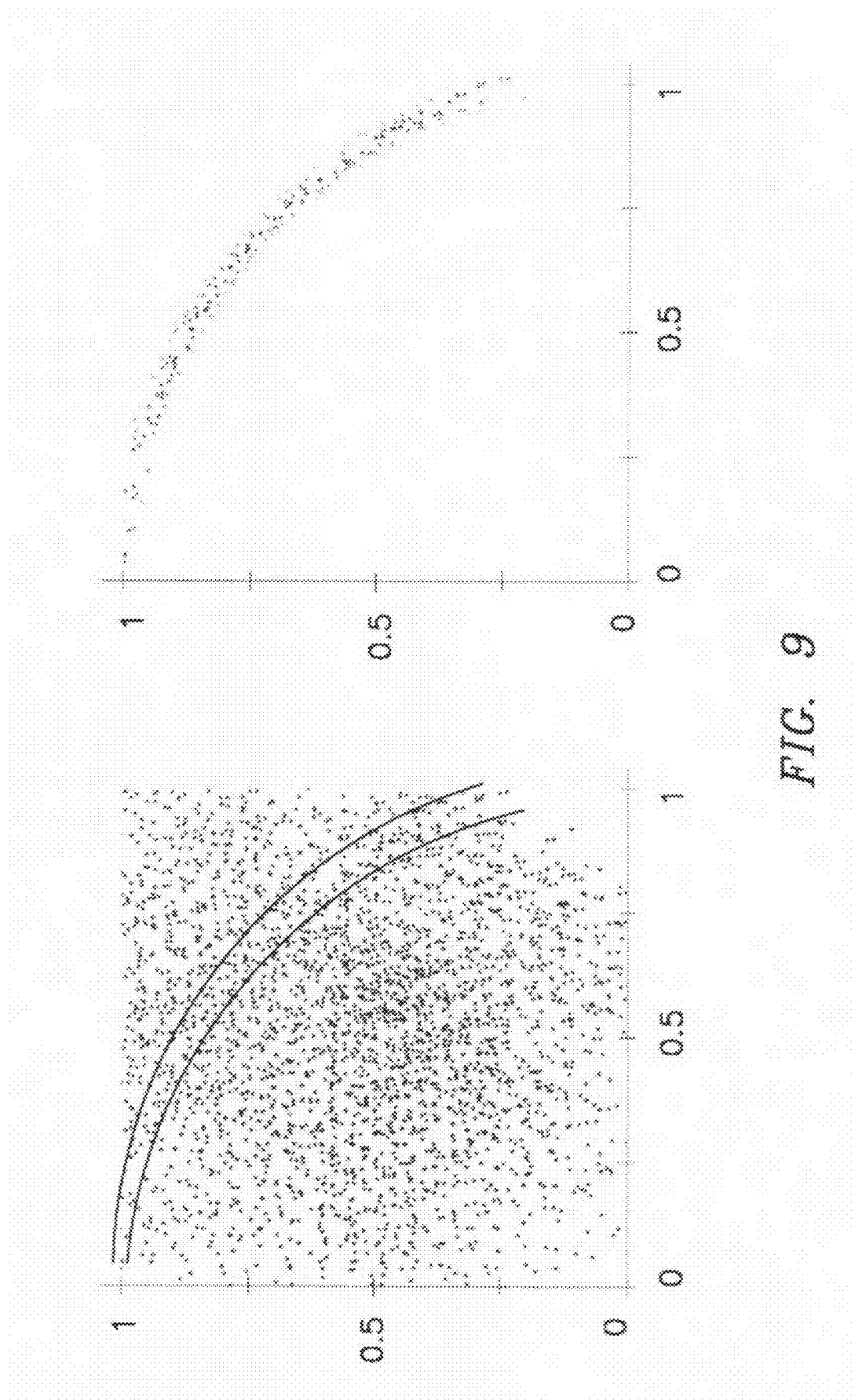
FIG. 9 shows a filtered and unfiltered image of the music universe in an example of the present invention.
Figure 10:
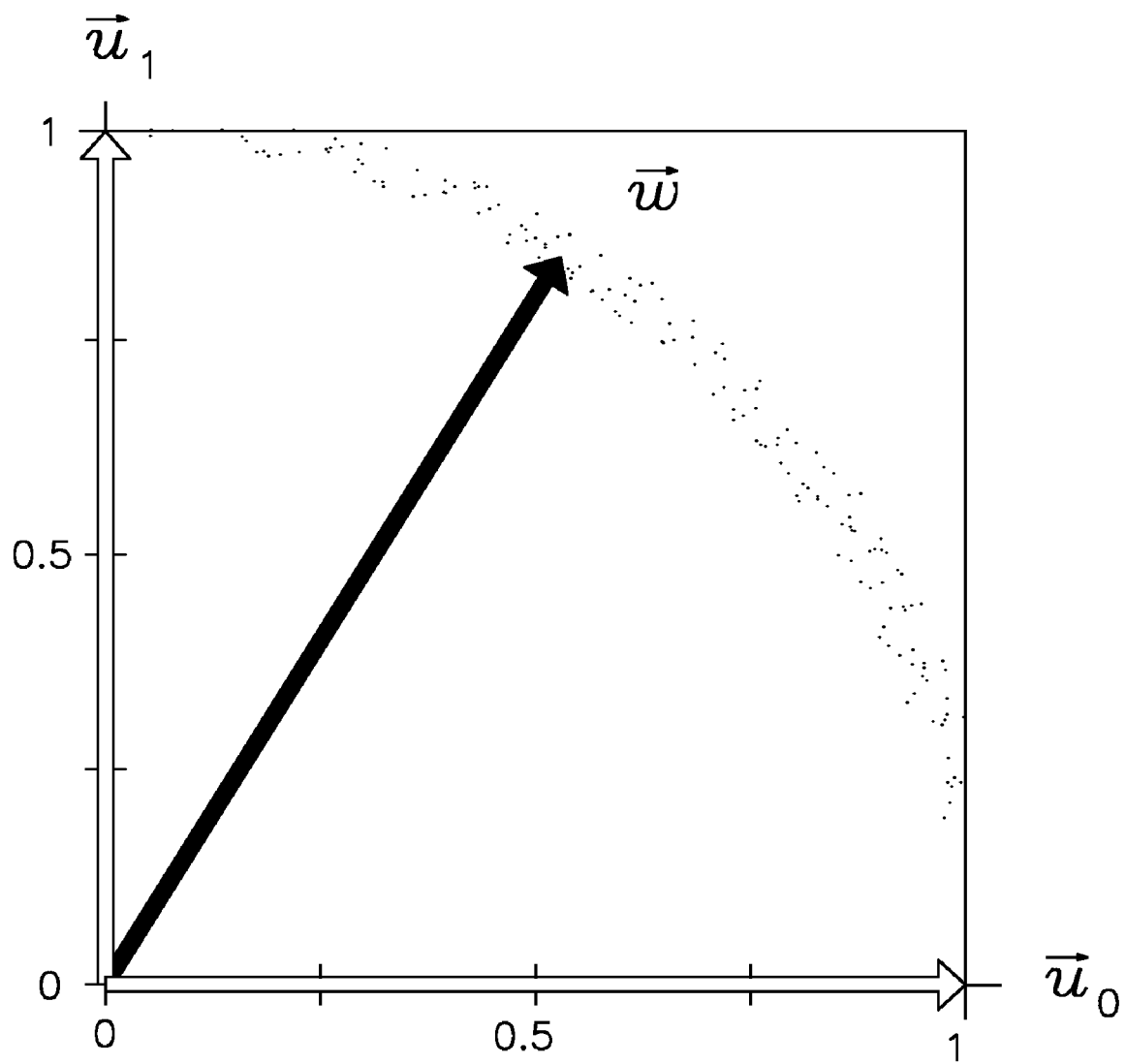
FIG. 10 shows a taste vector in the filtered music universe of FIG. 6.
Figure 11:
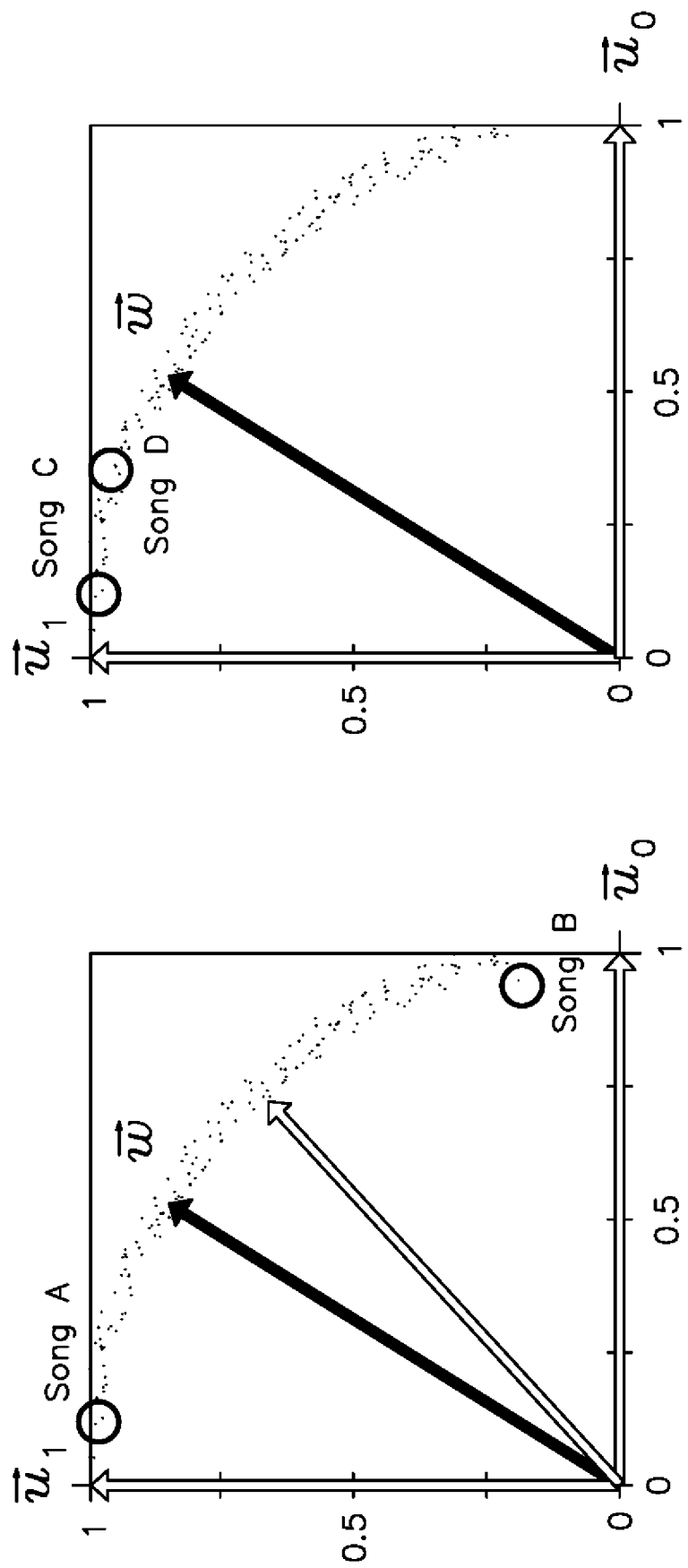
FIG. 11 shows alternate song pair selections in the filtered music universe of FIG. 6.

FIG. 9 shows the original music universe with tempo and rhythm descriptors of the presented example on the left and the filtered universe on the right with only the songs vectors that have norm equal to one. In this example, we have selected a random user music taste vector $\vec{w}$ that has to be estimated. The estimated taste vector is determined by the mean of two vectors that define a part of the universe. As classic EVE asks questions to the user, the region reduces in size and finally the user taste vector is estimated to be within the final region, with some uncertainty. Originally, this region contains the entire universe as seen in FIG. 10. The most sensitive point in this process is to find the pair of questions that improves learning. To improve learning means that the universe region converges to the estimated taste faster and more accurately. FIG. 11 shows an example of the best possible first pair of questions to show the user (Song A & Song B) and a worse song pair (Song C & Song D). In theory, the best pair, Song A and Song B, makes it easier for the user to select the preferred song because both songs in the pair are more different, more distinguishable. Songs C and D are not dissimilar enough to discern a preferred characteristic.

In FIG. 11, the user—with the linear assumption always present—should have to prefer song A rather than song B because the grade of song A is higher than the grade of song B for a given $\vec{w}$. It can also be seen from a geometry point of view because the dot product gives the cosine of the angle between vectors and the angle between song A and $\vec{w}$ is smaller than the angel between song B and $\vec{w}$.

$$\vec{s_A}\vec{w} > \vec{s_B}\vec{w}$$

Figure 12:
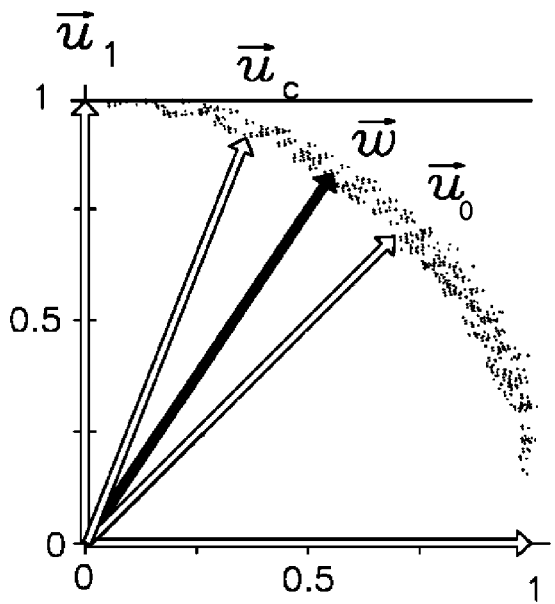
FIG. 12 shows a narrowed music universe after a first song selection.

The next step is to divide the Music Universe considering the answer sent by the user. This is visible in FIG. 12, which shows an updated Music Universe region as a consequence of user song selection. Please note that the mean region vector has also been updated.

Figure 13:
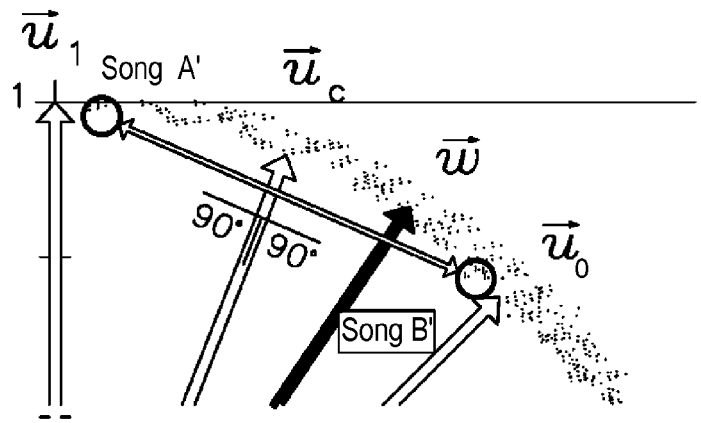
FIG. 13 shows a further narrowed music universe after a second song selection.

Referring to FIG. 13, in the next level of the learning algorithm, the region has changed and a new vector has been introduced $\vec{u}_c$ which is defined as the normalized sum of the region vectors $\vec{u}_0$ and $\vec{u}_1$. If the learning process stopped here, the estimated taste vector would be $\vec{u}_c$. However, if the algorithm continues, the classic EVE approach finds a second question that maximizes the probability to learn something correct from the answer given to the question. To find the second question, another pair of songs is searched that combines high distance between them and orthogonality with the new region center, shown as song A' and song B'.

Figure 14:
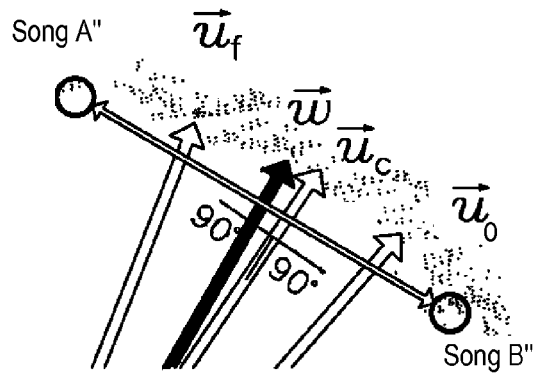
FIG. 14 shows a still further narrowed music universe after a third song selection.

Again, if user taste is consistent as well as the linear taste assumption, the user should have to select song B' in this second question as the angle between $\vec{w}$ and song B' vector is smaller than with song A'. The complexity of the method resides in selecting a good question between all the possible pairs of songs. The best possible pairs are always the same, but, to give the server a more diverse and natural behavior, the server avoids repeated questions between consecutive learning services. Following again our simple two-variable example, the region is updated again and a new pair of songs (song A" and song B") is presented to the user, as shown in FIG. 14.

Figure 15:
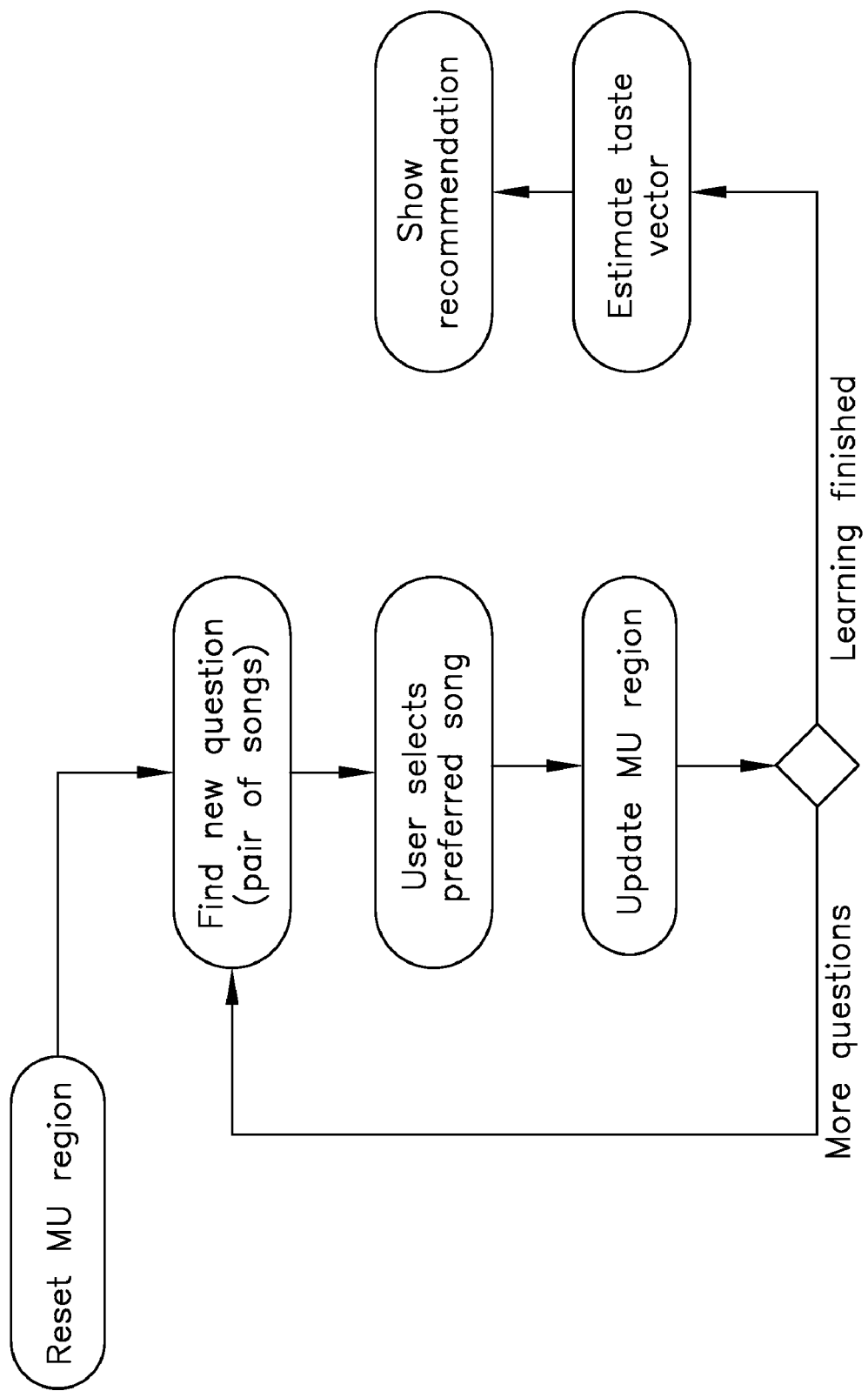
FIG. 15 shows a Mood state flow diagram.

The music taste estimation vector (given by the normalized region average) gets closer to the user taste vector as the algorithm goes forward. At the end, depending on the number of questions asked to the user, the error in vector taste estimation will decrease, but there is always a degree of uncertainty. Questions should, in theory, be more difficult to answer for the user, but this is only theoretical and depends on the user taste. FIG. 15 illustrates the learning algorithm in the MI Mood service.

Finally, to obtain a list of recommended songs, classic EVE evaluates all the songs with the music taste estimated vector, and sorts them decreasingly by grade.

As described above, classical EVE has some limitations that arise from its linear learning capability, and, because it was designed to be able to generate ideal questions while in the music framework, the number of songs is limited and a compromise has to be selected, because not all ideal questions (pairs of songs) exist. The main limitation, however, of classic EVE is that input songs must be normalized. That means that instead of having two descriptors, by normalizing we obtain a single descriptor that is related to the ratio between them and it is not possible to go back. In the real world, this would mean that two songs one with small values of tempo and rhythm and the other with high values of both descriptors would be considered by the system as being very similar. In the same way, the estimated vector cannot isolate between rhythm and tempo as the estimated vector is again a relation between them. It is not possible to differentiate between the following two music tastes:

"I like high tempo and high rhythm"

"I like low tempo and low rhythm"

This is solved by using a technique called Kernelization derived from the Support Vector Machines. It can be viewed as keeping a linear learning method like Eva, but, instead of using the original space (in our case, bidimensional for tempo and rhythm), using an extended space usually with more dimensions. This allows EVE to learn non-linear music taste vectors. The drawback of adding more dimensions, of course, is the increase of the uncertainty in the estimated taste.

$$(s_x, s_y) \xrightarrow{\text{KERNEL}} (k_x, k_y, k_z)$$

Figure 16:
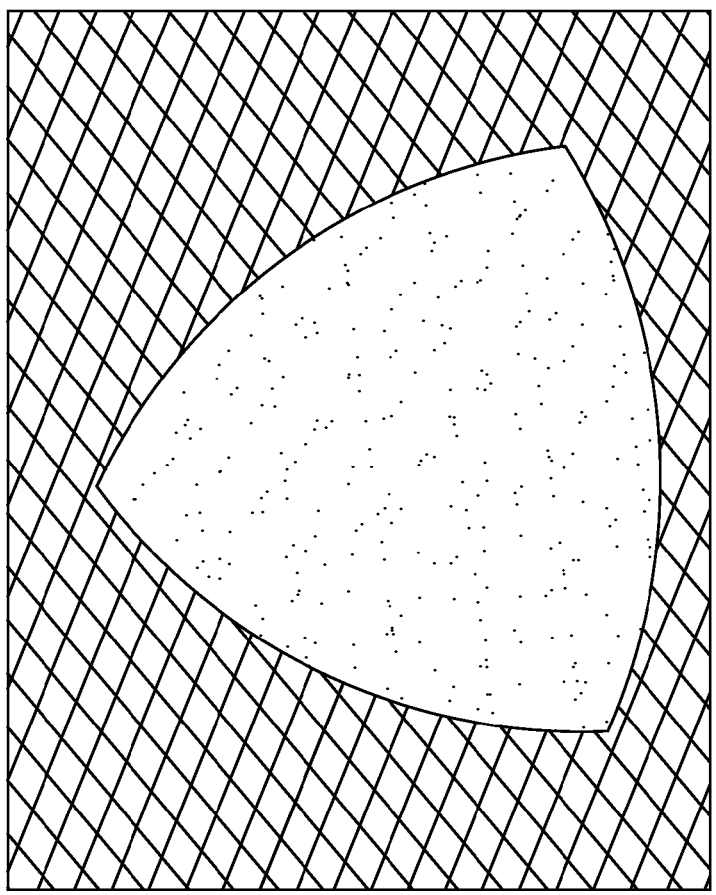
FIG. 16 illustrates a visual transformation from a two-dimensional to a three-dimensional music universe according to the present invention.
Figure 16:
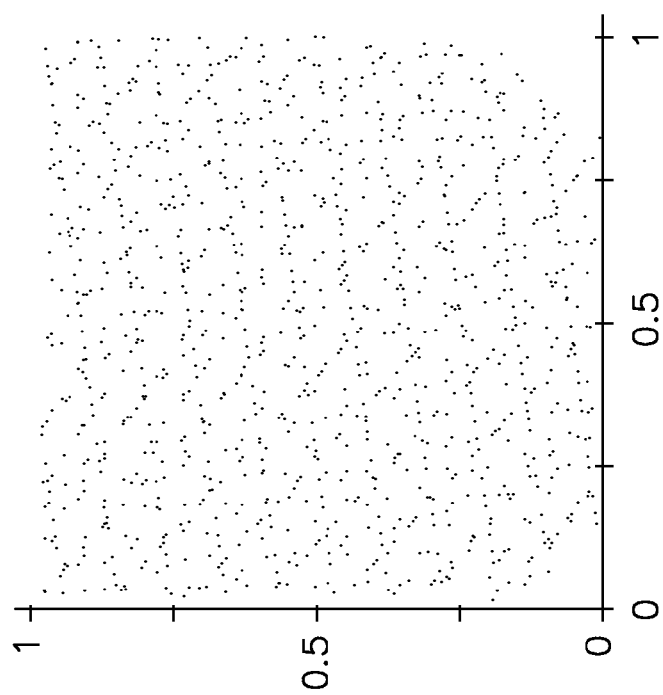

It is based on a transformation from two input variables [0, 1]×[0, 1] to three variables. The output 3D vector is normalized using a cylindrical transformation. From a geographical point of view, the kernel maps a 2D quadrant into the surface of a quadrant of a sphere. This is depicted in FIG. 16.

The first step of the kernelization adds a margin to the data in order to avoid null border values in order to maintain nulls out of the transformation chain.

$$g_x = 0.005 + 0.99 s_x$$

$$g_y = 0.005 + 0.99 s_y$$

In classic EVE, only the angle between the two variables was significant. In the current algorithm, the non-linearity comes from also using the module of the vector. This makes it possible to learn in which part of the Music Universe the user taste resides.

$$r = \sqrt{g_x^2 + g_y^2}, r > 1 \rightarrow r = 1$$

$$\theta = \text{atan2}(g_y, g_x)$$

The 2D to 3D transformation is performed mapping input variables into spherical coordinates:

$$k_r = 1$$

$$k_\theta = \frac{\pi}{2} r$$

$$k_\phi = \theta$$

The operational space for classic EVE is Cartesian and kernelized variables are finally obtained by the Spherical-to-Cartesian transformation:

$$k_x = k_r \cos k_\theta \sin k_\phi$$

$$k_y = k_r \sin k_\theta \sin k_\phi$$

$$k_z = k_r \cos k_\phi$$

In summary, the Kernelized Eva is a classic EVE that operates within a universe that has one more dimension. This makes possible to learn non-linear music tastes in a controlled manner as the convergence of classic EVE is assured because it is a linear algorithm. The estimated vector has, therefore, three dimensions. Accordingly, the recommendation of songs also must be performed in the kernelized universe. 3D classic EVE is a bit more complicated because there is one more dimension, and the region update strategy is not so straightforward. Furthermore, in the selection of pairs of songs an extra degree of freedom has to be taken into consideration.

Imagine that the database consisted of less than a thousand songs. Then the total number of pair of songs is given by the following expression:

$$N(N-1)/2$$

Figure 17:
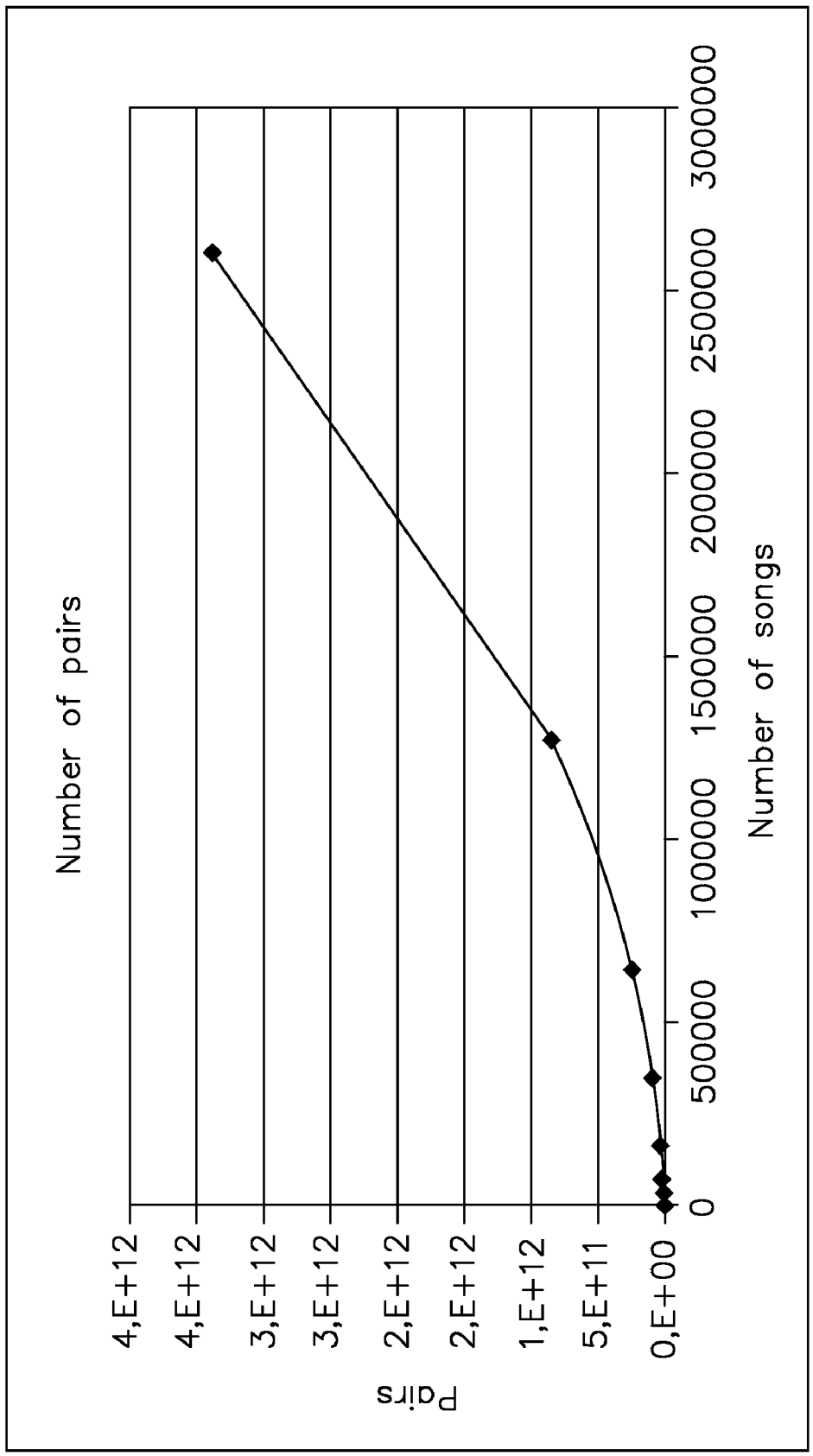
FIG. 17 illustrates the evolution of the number of song pairs to be analyzed according to the present invention.

With less than 1000 songs, it is possible to compute all the possible pairs (0.5 M pairs), and select and store those more adequate for learning. The MIU Server, however, supports music databases of several millions of songs. FIG. 17 shows the number of pairs to evaluate as a function of the total number of songs.

Looking to the rapidly growing function, it is clear that it is not possible to sweep all pairs to determine the preferable pair of songs for learning. This is the key of the music learning process, defining what a good question means. Intuitively, two songs very similar (with a small Euclidean distance in the Music Universe) cannot form a learning pair because it should be difficult for the user to select the preferred one. This is one of the three criteria: Euclidean distance has to be maximized in song pair selection for the learning process. The second criterion is quite obvious, but it has a significant impact in the design. Sometimes, a song has some properties (resides near the border of the music universe for example) that makes it very useful for music taste learning. However, it is very poor for a music interface point of view to repeat songs in consecutive questions so the algorithm needs to have memory. Finally, the last and most important idea: the pair that maximizes music taste learning convergence, besides the song distance, depends on the current state of the algorithm; in other words, it depends on the answers given by the user to previous questions. To summarize these facts, the conditions for song pair selection are:

Maximum Euclidean distance between the songs to help the user selecting the preferred one.
Non-repeatability of songs during learning and from previous learning (algorithm song black list and diversity generation).
Maximum orthogonality to the current Music Universe region to help the learning algorithm converge.

With only a few thousands of songs, all the possible pairs can be evaluated to see if they accomplish all the previous criteria to be included in the learning song pair database. Nevertheless, with millions of songs, this is very inefficient. Let us remember that songs are kernelized from the bidimensional PCA universe to an extended universe with three variables. Songs are therefore projected into the first quadrant of a sphere. Every point has norm equal to one and therefore it can be referenced with two spherical coordinate angles (latitude and longitude for a geographical system).

Figure 18:
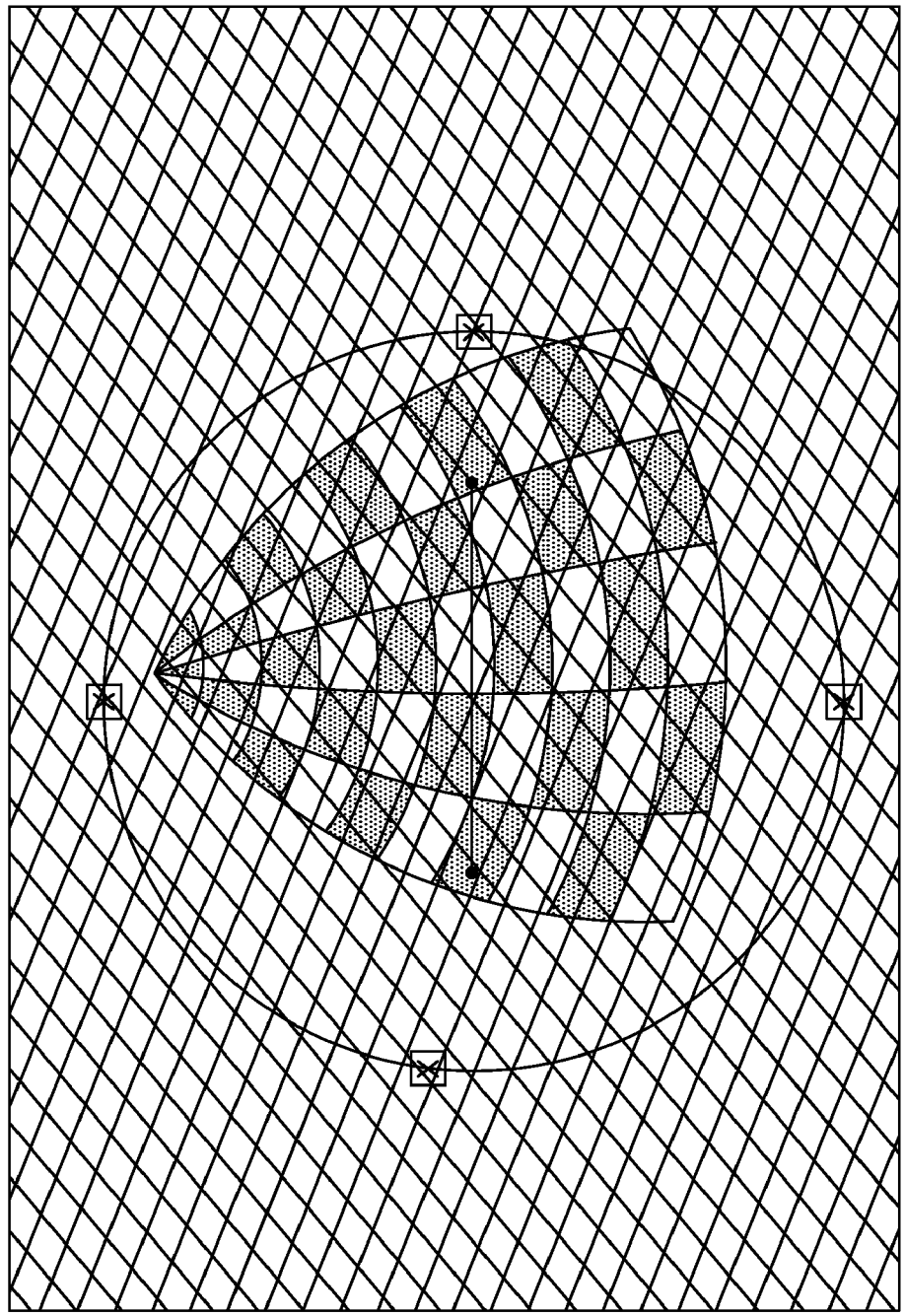
FIG. 18 illustrates a visual transformation from a two-dimensional to a three-dimensional music universe according to the present invention.

In a preferred embodiment, the approach followed in order to sweep all the possible pairs of songs is to divide and conquer. The sphere surface is divided with the use of meridians and parallels as seen in FIG. 18.

Instead of looking for the longest distances between the songs, the examination is done only between the crossing of the parallels and meridians and songs are grouped in these crossings. The surface is therefore divided in a grid and every song belongs to one cell of the grid. Only the longest cell distances are computed and the total number of possible pairs is reduced dramatically without losing any high distance pair.

Figure 19:
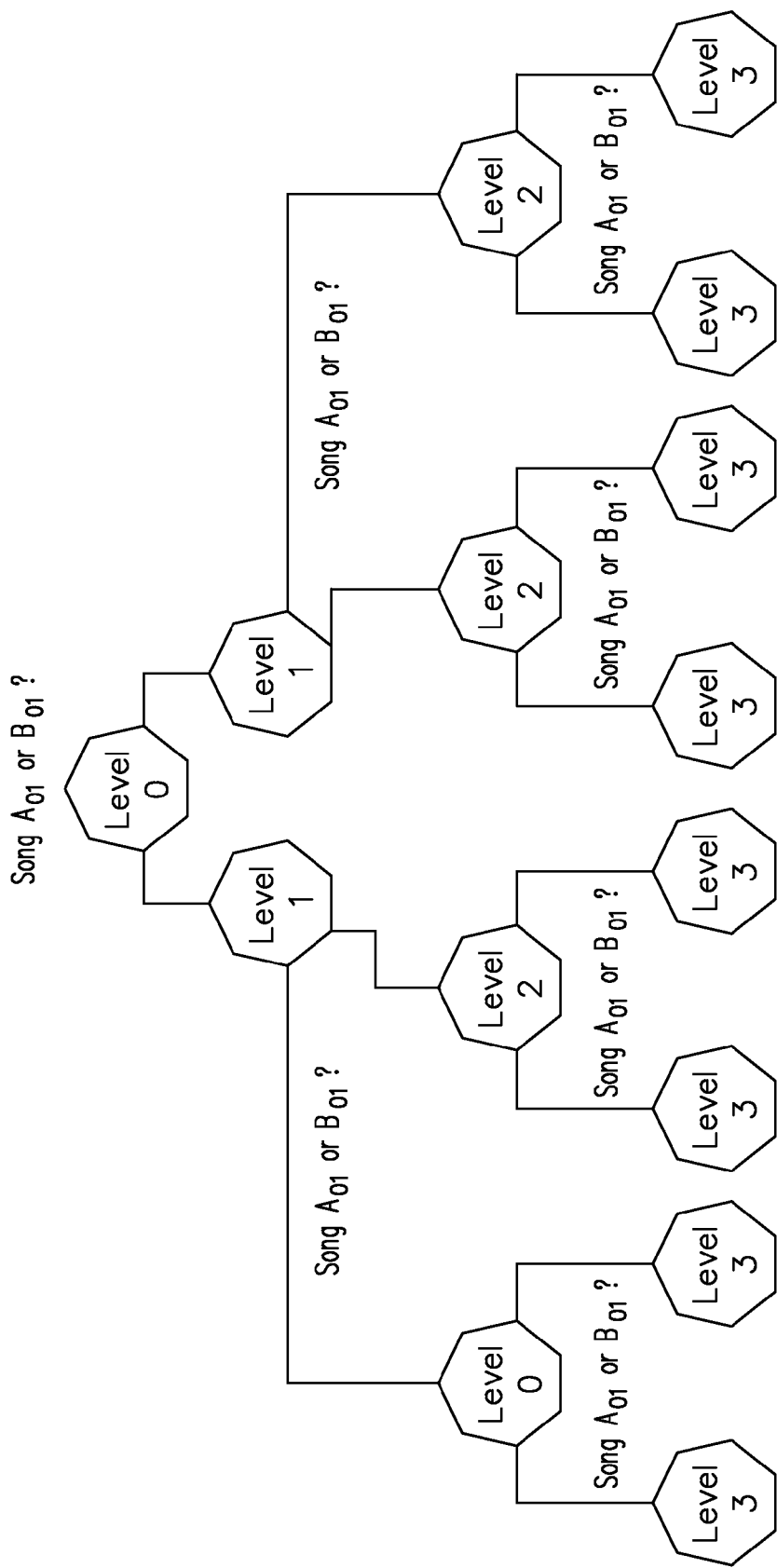
FIG. 19 shows a pre-calculated learning tree for three questions in an example of the present invention.

To increase performance dramatically and control algorithm behavior during runtime all the possible states of the learning progress are calculated in the encoding of the database. For example, for 10 questions (by default), there are 2^10 (1024) possible different sequences of answers (level 0: song A, level 1: song B, level 2: song A, etc). An example of the tree is shown in FIG. 19.

For each node of the learning tree, an ideal analytical pair of songs is created (their kernelized 3D vectors) and using the clusterization described above, pairs of songs are located that are the most similar with the ideal pair of songs. Some "impact" criteria are followed also to avoid repeated questions, so as to increase the diversity of the final learning tree. In runtime, the server only has to keep track of the current node in which the user is, and from the collection of possible pairs of each node, select those that do not contain already used songs. The response time per question has also been divided by 100,000, and it is possible to know beforehand the behavior of the learning tree as simulations can be done introducing a known music taste vector. Finally, the speed of convergence of the algorithm has been reduced intentionally to make the algorithm more robust. For the 2D example, instead of starting with a region that occupies 90° of the quadrant, then after the first question, the region is divided in two to get 45° and so on. In the current release of the algorithm the region is not divided by 2 in every step, but by 1.76 (optimal value found experimentally). This allows small estimation errors when the taste vector lies near the axis.

Figure 20:
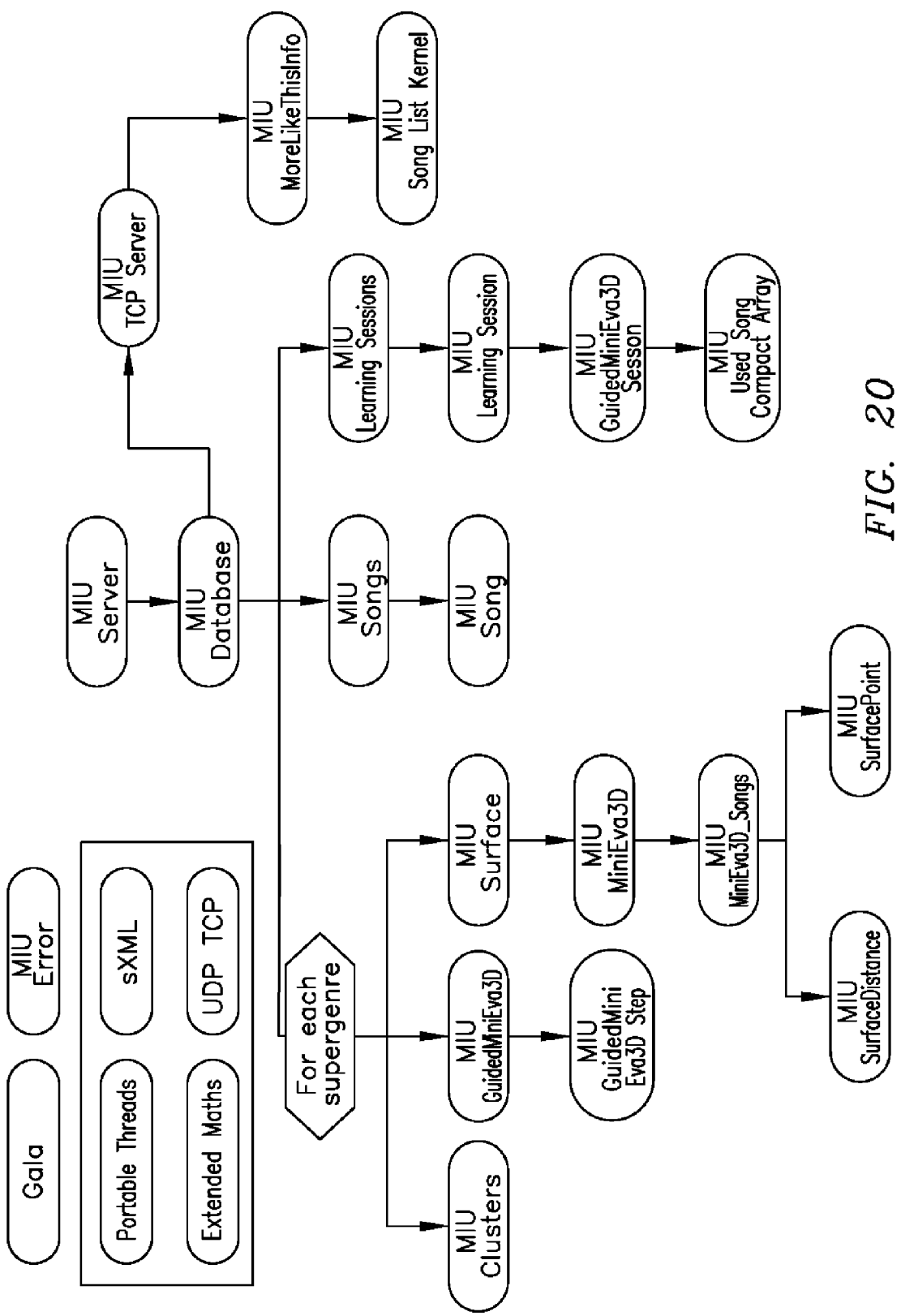
FIG. 20 shows the operational hierarchy and relations of the most significant classes according to the present invention.

FIG. 20 shows the operational hierarchy and relations of the most significant classes. In a preferred embodiment, there are two main operating modes:

1. SOCKET LISTENER: The MIU Server class creates a thread for each MIU database and opens a socket port for listening to queries. When the PHP modules asks for a MI Soundalikes service, the server creates a thread MIU_MoreLikeThisInfo that does the work, retrieves additional information and sends the list of songs back through the same socket using MIU_SongListKernel. If the service is a MI Mood service (music taste learning), a MIU_LearningSession is located in the list of slots of MIU_LearningSession and a new learning algorithm is started using the pre-calculated tree for the selected supergenre (MIU_MiniGuidedEva3D). During taste estimation, used songs are stored in a binary Boolean compact array to avoid repeated songs.
2. ENCODING: the second type of executions, parses an ASCII file containing a list of songs with their identifiers, genres, PCAs, vectors, etc and creates three binary files:
   a. Song binary file: contains song information in more compact format as well as song descriptors and kernelized PCAs (MIU_Songs and MIU_Song).
   b. Cluster binary file: contains the classification based on the ADAM technology (MIU_Clusters).

c. Learning binary file: a recursive algorithm simulates (MIU_MiniEva3D) all the possible answers of an EVE algorithm of N questions (2^N) and finds the best possible pairs of songs to be used in every node (MIU_GuidedMiniEva3D_Step) of the learning tree (MIU_GuidedMiniEva3D). To be able to handle several millions of songs, a cluster strategy is followed to group the songs and find the longest pairs (with higher distance between songs) that maximize learning convergence (MIU_SurfaceDistance and MIU_SurfacePoint).

The system allows for an innovative user interface where the Music Universe of a particular catalogue is displayed in a two-dimensional music constellation based on an automatic classification of the music according to the music similarities.

Figure 21:
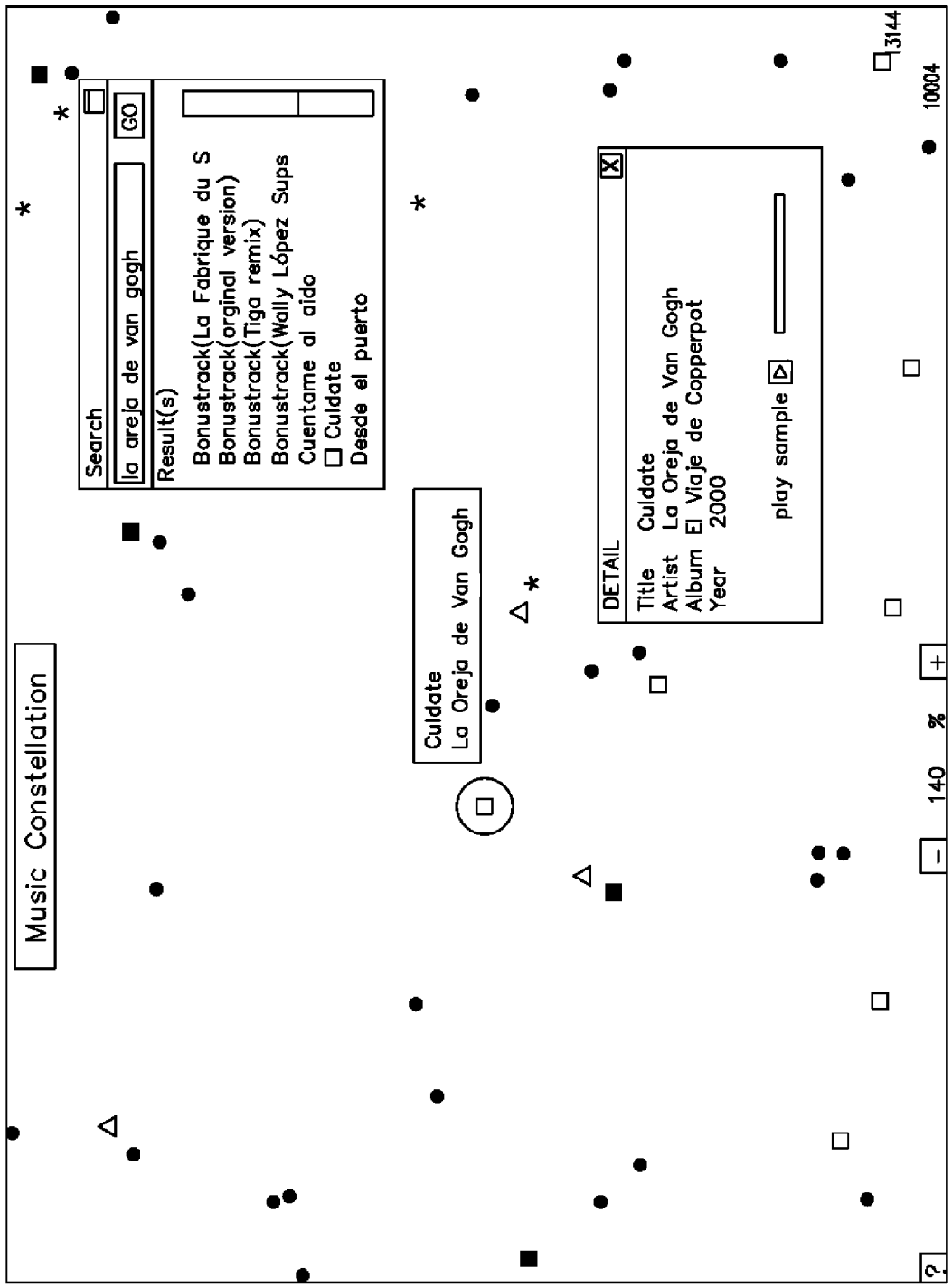
FIG. 21 is an illustration of a graphical user interface for the Music Constellation service according to the present invention.

Referring to FIG. 21, an illustration of a graphical browser shows a Music Constellation. The browser collapses the multidimensional vector space created by the spectral deconvolution analysis into a two dimensional music array, where the distance between songs corresponds to musical similarity. In this way, users can very quickly and easily browse musically similar songs. For example, a user can navigate through the Constellation and discover mathematically similar music or search for specific songs and discover other similar music in that part of the universe. The search capabilities enable the user to search for a particular song or search for an artist, and then select a song from that artist. The user can merely pick a star and click to listen to the music and similar music that is nearby.

A further innovation is introduced to the method used in the Music Constellation. The basic idea behind the innovation is to convert a given space into a target space, by learning from examples. Typically, examples of similar songs (in whatever sense), are fed to a machine learning algorithm to learn the optimal (possibly nonlinear) transformation to obtain a space in which similar songs are close to each other. This method is very general and can be used for many applications, such as classification by genre or artist, etc. In this example, the system is fed with labeled songs. Traditional linear classification techniques can then be applied in the new space. To obtain recommendations, the system is fed with groups of similar songs. Songs close to one another in the new space will maintain the desired similarities. To obtain generation of a playlist, the system can learn a space in which recently played songs are close one to each other, and then propose songs in the same region of the new space.

The steps of the method include:
building a training database of groups of songs desired to be close to each other in the new space;
applying General Discriminant Analysis (GDA) to the training database;
projecting the whole database used in the target application using the transformation learned from GDA;
applying the algorithm required for the target application. That is, finding the nearest neighbors for recommendation by applying machine learning algorithm for classification.

General Discriminant Analysis is a kernelized (generally nonlinear) version of Linear Discriminant Analysis (LDA). GDA produces a data projection that maximizes class separability of the projected training data. In specific testing, GDA was performed using statistical pattern recognition tools.

Figure 22:
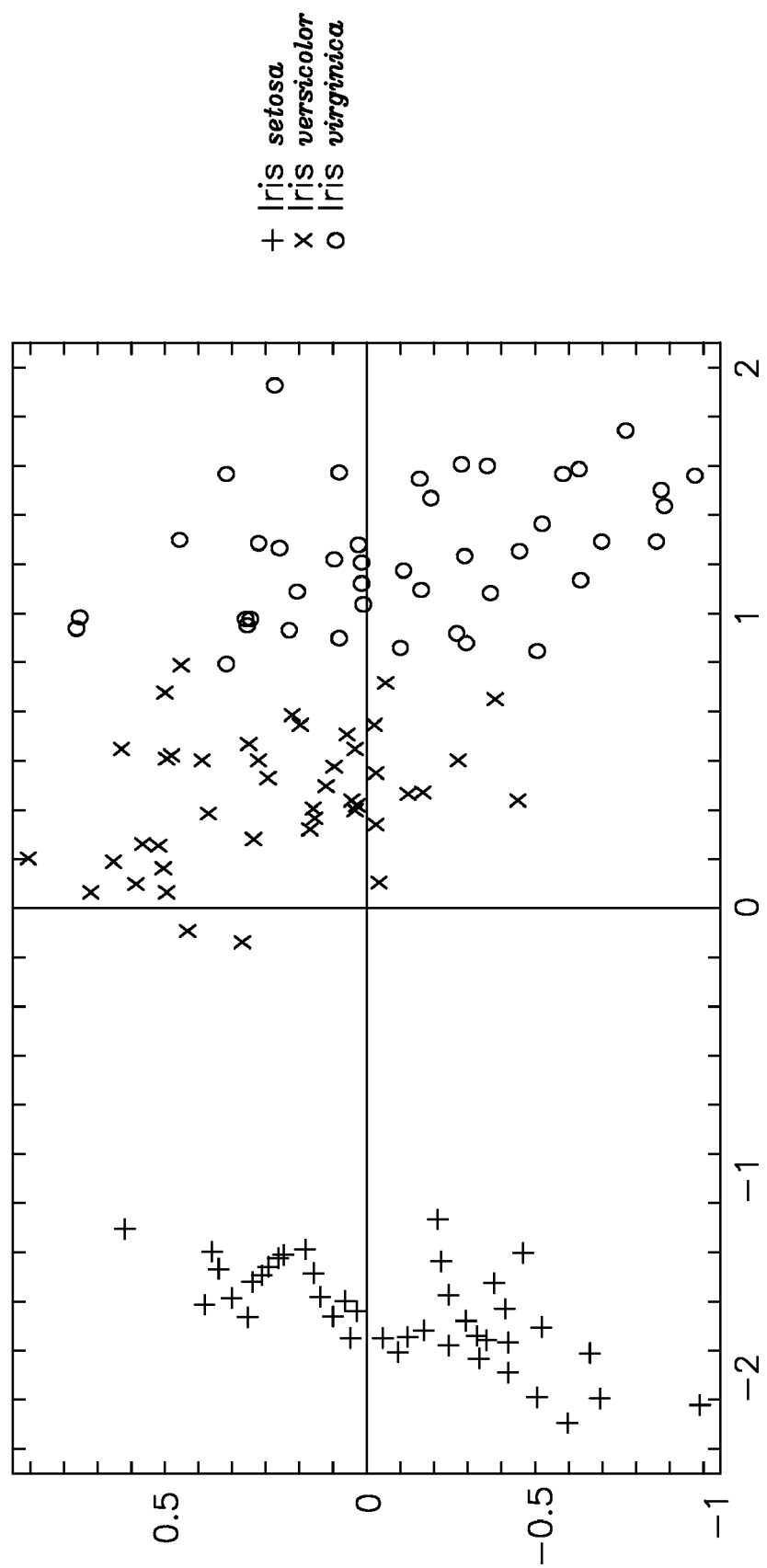
FIG. 22 shows Iris data projection on two dimensions using Linear Discriminant Analysis.
Figure 23:
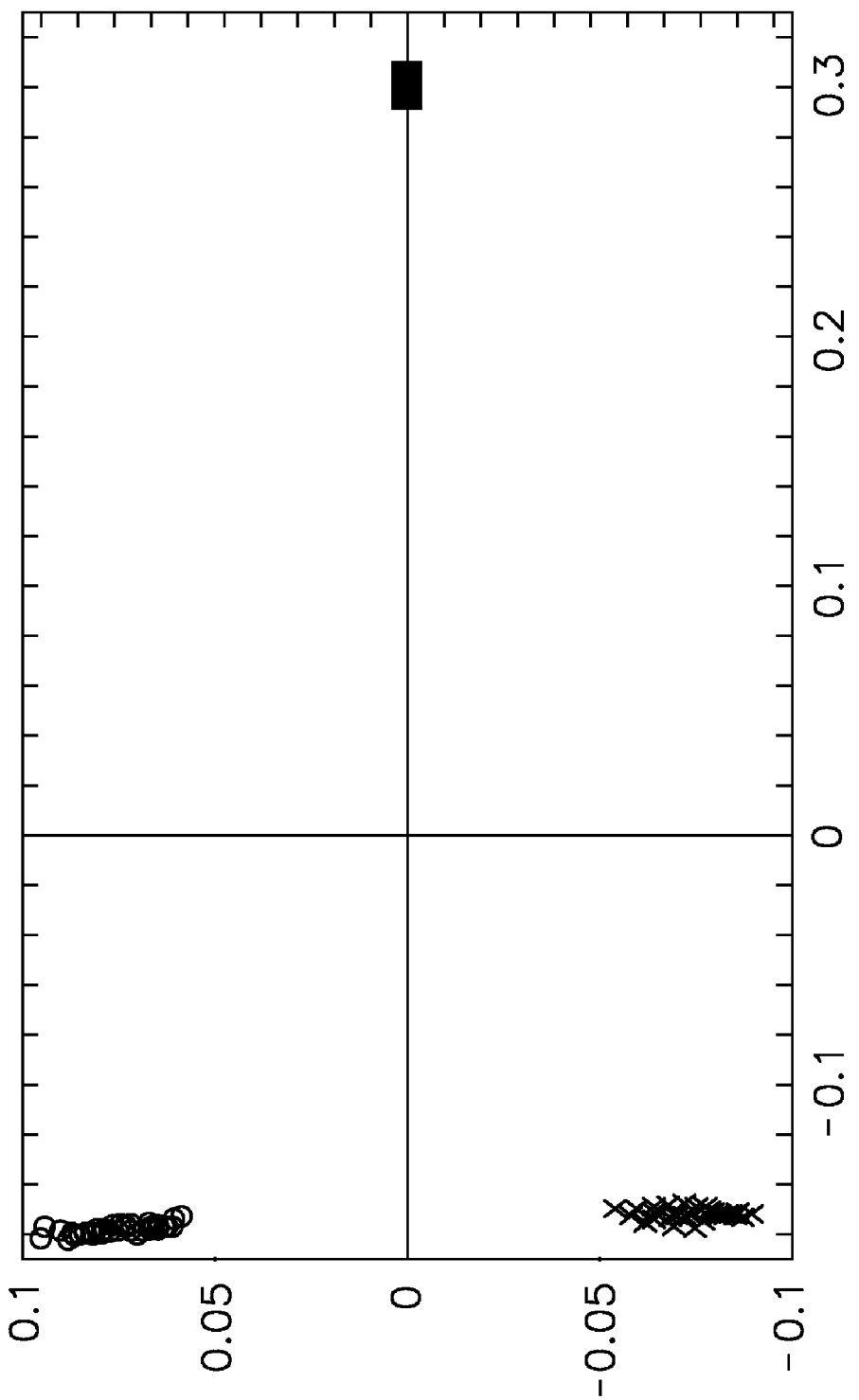
FIG. 23 shows Iris data projection on two dimensions using Generalized Discriminant Analysis.

FIG. 22 shows Fisher's Iris data (widely used for examples in discriminant analysis and cluster analysis for testing machine learning algorithms) projected on the first two dimensions found by LDA. FIG. 23 shows the same data projected on the first two dimensions found by GDA. This example shows how well the classes are separated in the projected space using GDA.

Figure 24:
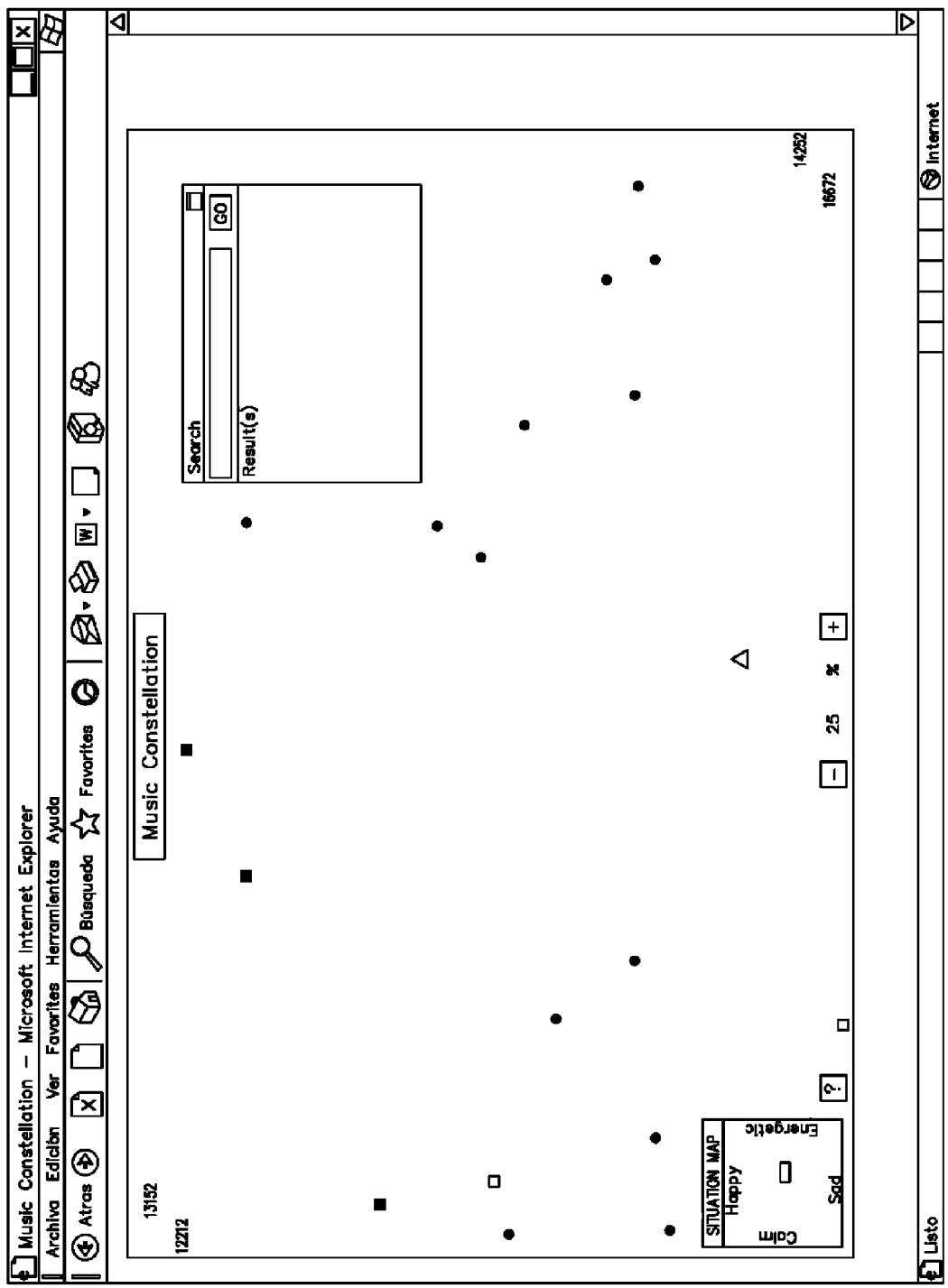
FIG. 24 is an illustration of a graphical user interface for the MI Moodstellation service according to the present invention.

In a particularly preferred embodiment, the user's Music Constellation interface can display the music taking particular music and mood parameters into account. For example MI Moodstellation displays the universe of music in a two dimensional constellation based on an automatic classification of the music combining the global music similarities with four global characteristics or moods, as shown in FIG. 24. The four moods are happy, sad, calm, and energetic. Other or additional mood classifications can be used. The MI Moodstellation graphical browser collapses the multidimensional vector space created by the spectral deconvolution analysis into a two (or n) dimensional space, where the distance between songs corresponds to musical similarity based on the four selected moods.

Figure 25:
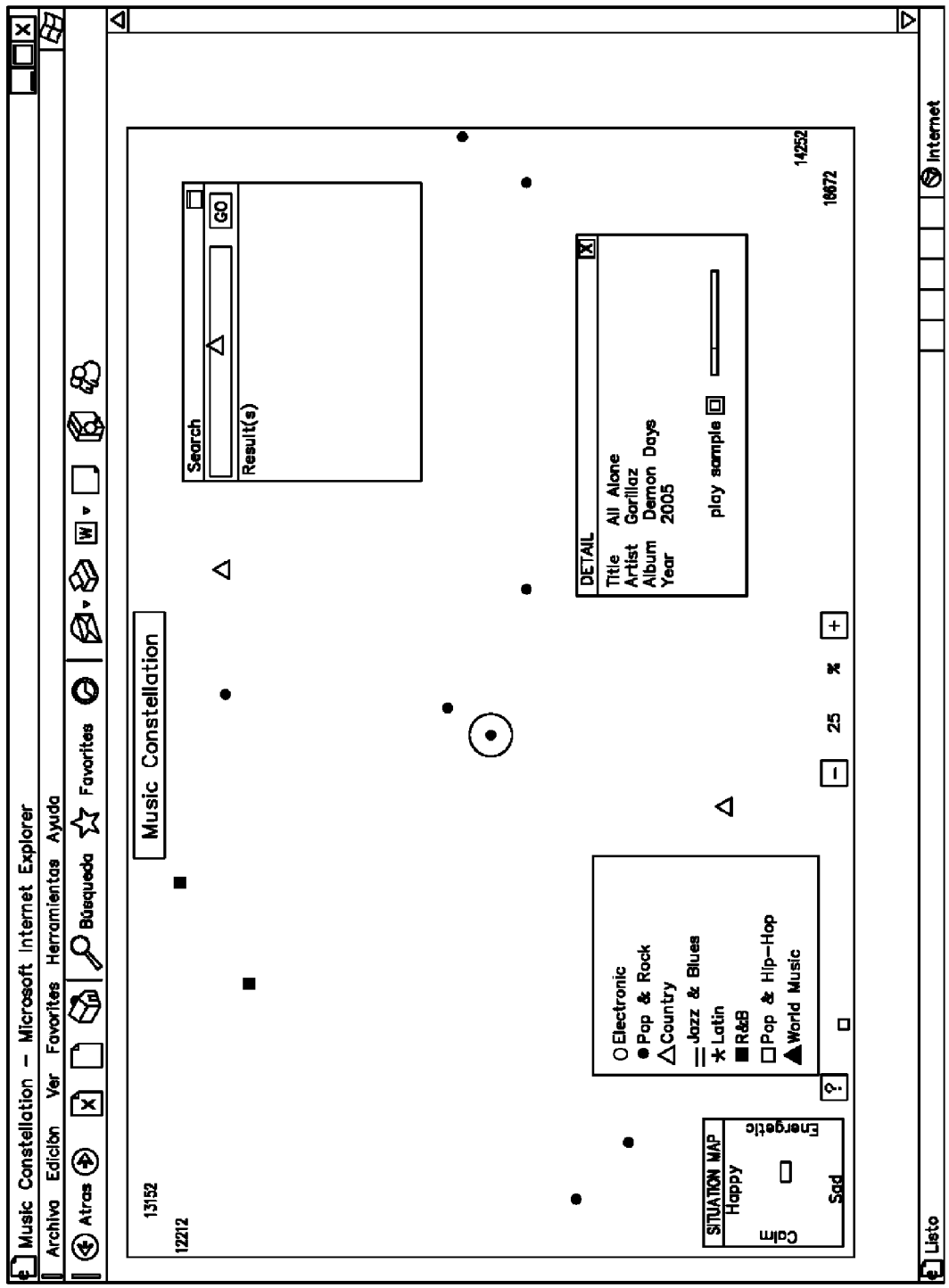
FIGS. 25-29 show the graphical user interface for the MI Moodstellation of FIG. 24 to illustrate additional features according to the present invention.

Using the method described above, through MI Moodstellation, users can very quickly and easily browse musically similar songs relative to mood related parameters. As shown in FIG. 25, the constellation uses color codes or other symbols to identify different genres of songs.

Figure 26:
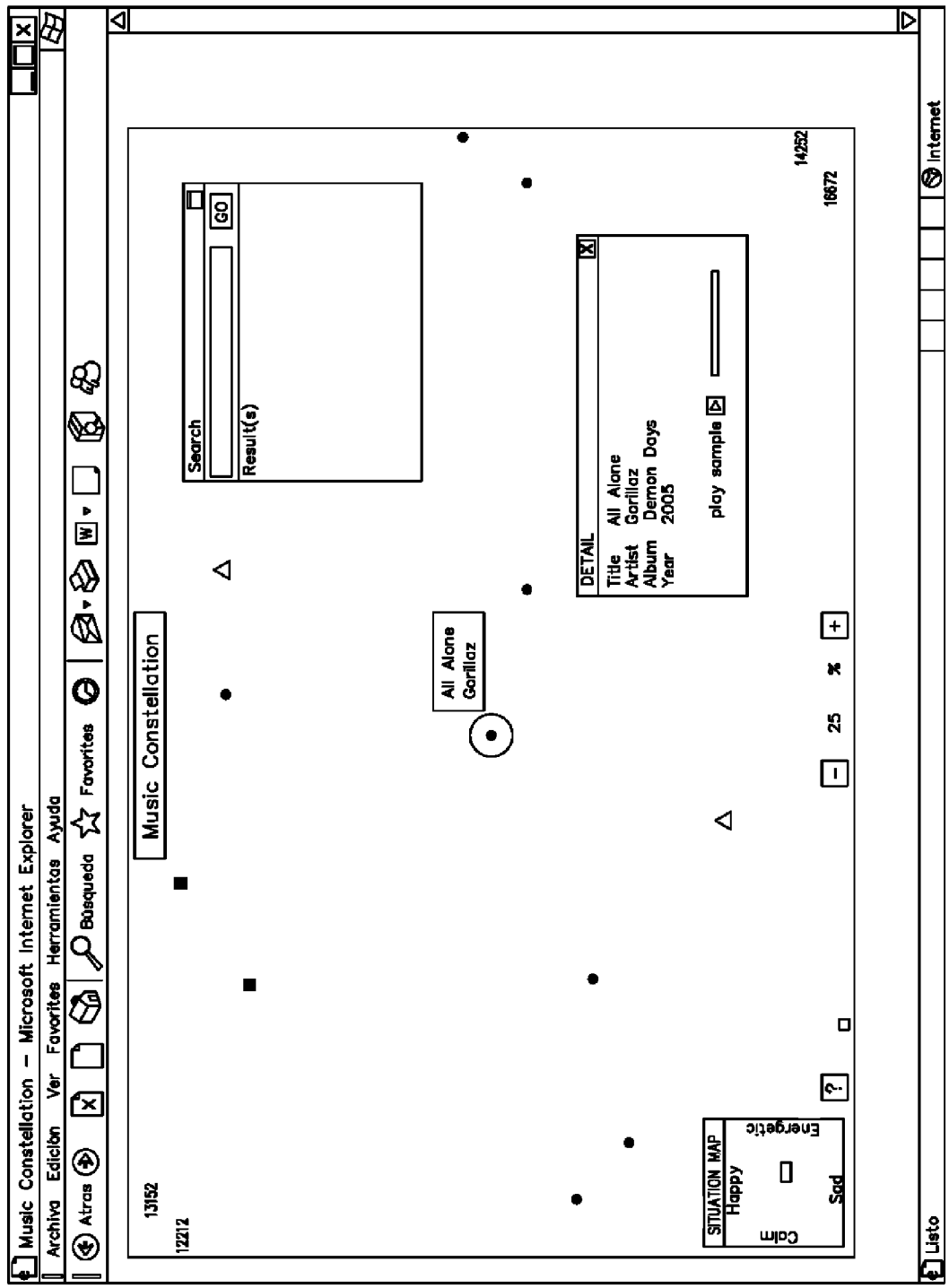
Figure 27:
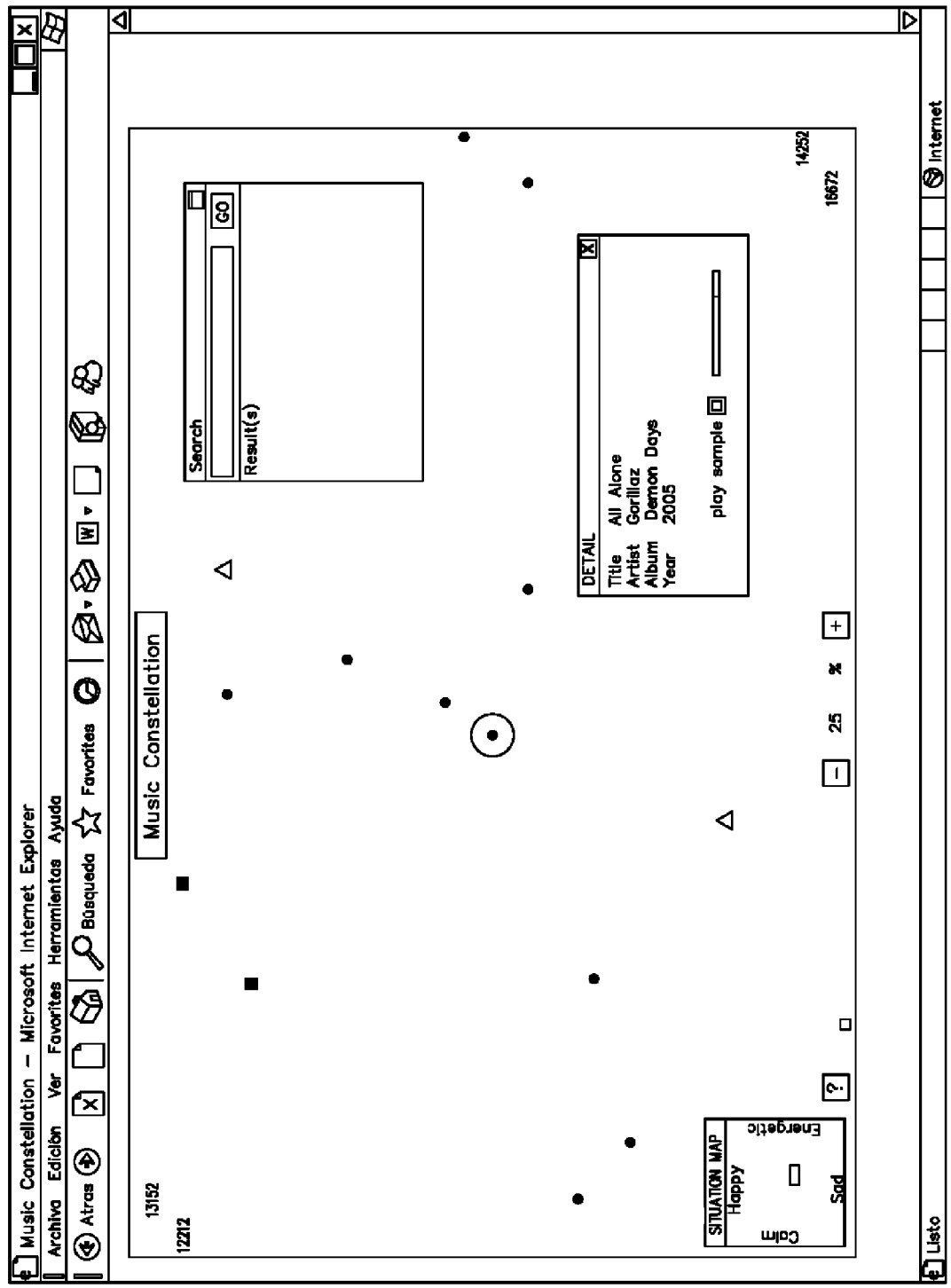
Figure 28:
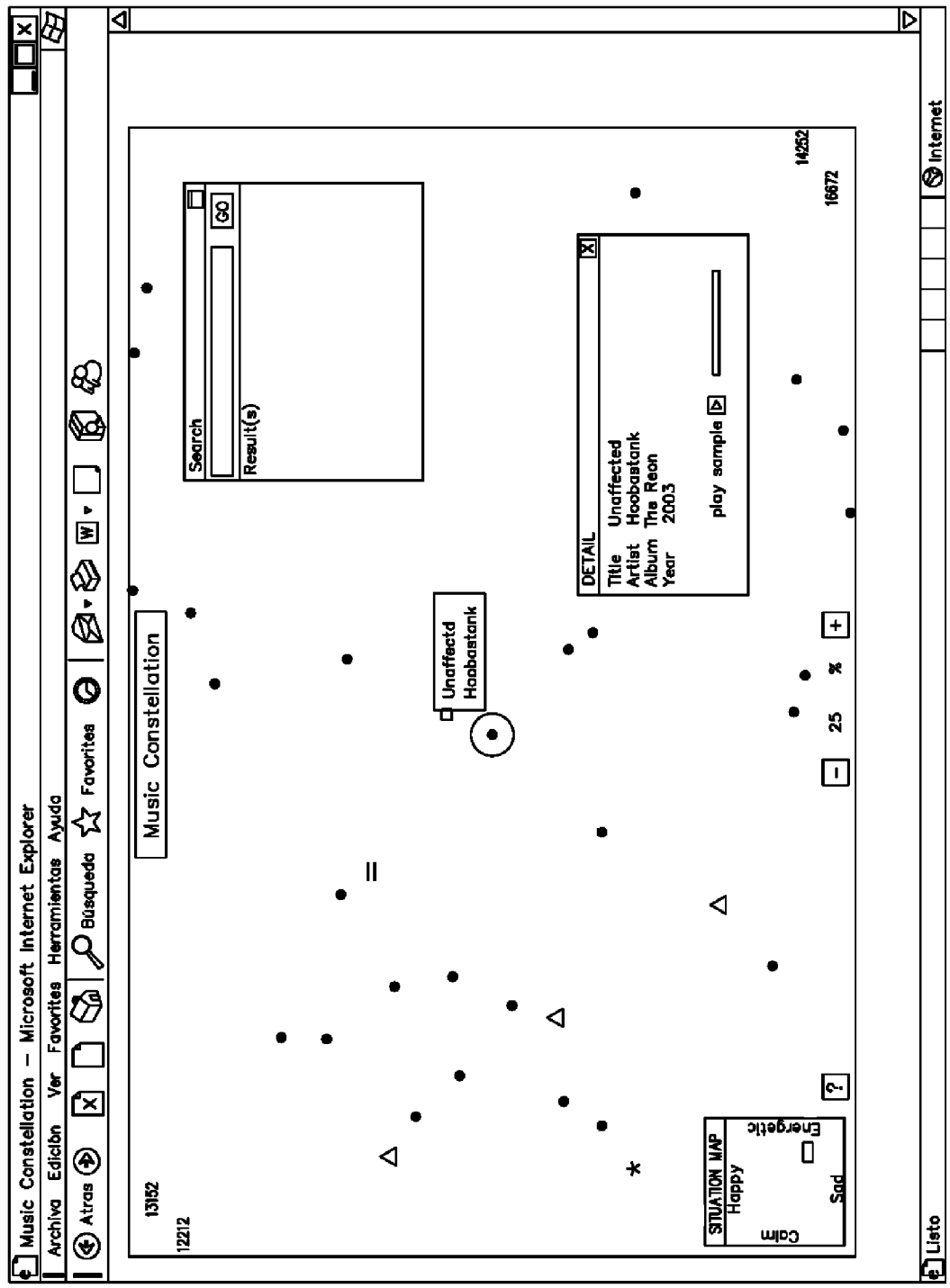

FIG. 26 shows that the user can scroll over a selected song and determine the metadata for that song. FIG. 27 illustrates the ability to listen to a 30-second song clip of the selected song. In FIG. 28, the user has moved to another zone of the music universe as illustrated in the Situation Map.

Figure 29:
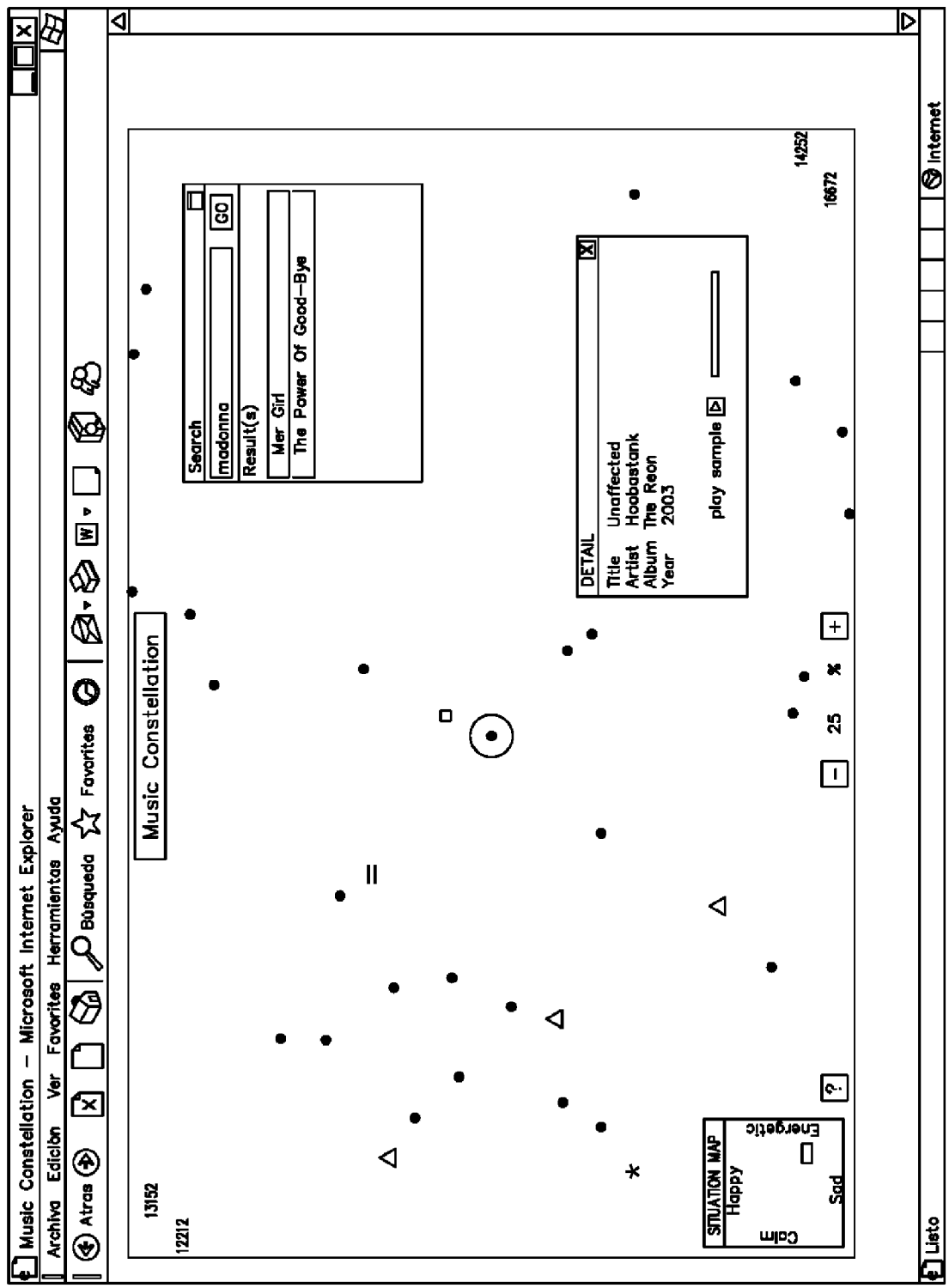

Using the Music Constellation graphical browser interface (both in MI Constellation, and MI Moodstellation), a user can also search for a song, or an artist in the music universe and choose a song from an artist that has been previously selected, as shown in FIG. 29.

In a retail environment, all these methods can easily be used in in-store terminals, on retail websites, on MP3 players, or on MP3 mobile phone handsets. The same techniques can be used for playlist generation from a personal music collection, or anywhere that similarities between pieces of music can be useful.

Additionally, similar analysis techniques can be used to analyze film, video, and television. The techniques described herein can provide a fast, accurate, and less costly system for analyzing movies, television programs, and videos for potential market success, and recommendation, among other measurable criteria.

For such video analysis, the system considers relevant variables for characterizing films, videos, and television programs including: image analysis (both static and video), sound analysis (including music, voice, sounds, and noise), script analysis, structural analysis (length, scene structure, scene changes etc), and metadata analysis (name of studio, director, actors, etc. . . . ). Furthermore, the system can analyze historical data related to the films, videos, and television programs' commercial success in order to create a "success" database. This database will enable comparisons between new or unreleased content and previously released content regarding the intrinsic movie parameters described above, in order to predict the market success of new projects as well as gain other meaningful data to inform other marketing decisions.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method of determining a user's preference of music, said method comprising the steps of:
   a) providing a digital database comprising a plurality of digital song files;
   b) mathematically analyzing each said digital song file to determine a numerical value for a plurality of selected quantifiable characteristics;
   c) compiling a song vector comprising a list of said numerical values for each of said plurality of selected characteristic for each said song file;
   d) selecting and storing a representative portion of each said song file wherein said representative portion substantially mathematically matches the song vector of said song file;
   e) choosing a pair of two dissimilar representative portions and enabling said user to evaluate both representative portions;
   f) permitting said user to indicate which of said two dissimilar representative portions said user prefers;
   g) based on the indication from said user of which of said two dissimilar representative portions said user prefers, finding another pair of dissimilar representative portions to maximize the probability to learn something about the user's preference; and
   h) repeating steps e) through g), as necessary, to establish a taste vector for said user comprising song characteristics that said user prefers.

2. The method according to claim 1, wherein said method is performed via a computer website.

3. The method according to claim 1, wherein none of said pairs of two dissimilar representative portions are repeated between consecutive steps.

4. The method according to claim 1, wherein each of said pairs of two dissimilar representative portions are selected to maximize Euclidian distance between each song represented by said representative portions.

5. The method according to claim 1, wherein each of said pairs of two dissimilar representative portions are selected to maximize orthogonality with respect to previous pairs of representative portions.

6. A computer implemented method of determining a user's preference of music, comprising the steps of:
   providing a digital database comprising a plurality of digital song files:
   providing an analysis engine having software for use in a computer processor adapted to execute said software;
   using said computer processor to analyze each said digital song file to determine a numerical value for each of a plurality of quantifiable characteristics;
   using said computer processor to create a multidimensional song vector for each said digital song file, said multidimensional song vector representing the numerical values for each of said quantifiable characteristics;
   selecting and storing a representative portion of each said song file wherein the multidimensional vector for said representative portion substantially mathematically matches the multidimensional song vector of said song file;
   said computer processor choosing a pair of two dissimilar representative portions, presenting each said dissimilar representative portions to a user, and enabling the user to evaluate both representative portions;
   permitting said user to indicate which of said two dissimilar representative portions said user prefers;
   based on the indication from said user of which of said two dissimilar representative portions said user prefers, said computer processor choosing another pair of dissimilar representative portions to maximize the probability to learn something about the user's preference; and
   presenting additional pairs of dissimilar representative portions, as necessary, to establish a multidimensional taste vector for said user comprising song characteristics that said user prefers.

7. The method according to claim 6, further comprising the steps of:
   providing a user interface that allows the user to listen to each representative portion.

8. The method according to claim 7, said user interface further comprising means to enable said user to indicate preference of one representative portion.

9. The method according to claim 6, wherein said method is performed via a computer website.

10. The method according to claim 6, wherein none of said pairs of two dissimilar representative portions are repeated between consecutive steps.

11. The method according to claim 6, wherein each of said pairs of two dissimilar representative portions are selected to maximize Euclidian distance between each song represented by said representative portions.

12. The method according to claim 6, wherein each of said pairs of two dissimilar representative portions are selected to maximize orthogonality with respect to previous pairs of representative portions.

13. The method according to claim 6, said analysis engine further comprising a conceptual clustering engine based on physical pattern recognition.

14. The method according to claim 6, said analysis engine further comprising a non-linear kernel learner.

* * * * *